United States Patent
Sung et al.

(10) Patent No.: US 9,637,017 B2
(45) Date of Patent: May 2, 2017

(54) POWER-SHARING CHARGING SYSTEM, CHARGING DEVICE, AND METHOD FOR CONTROLLING THE SAME

(71) Applicant: Korea Institute of Energy Research, Daejeon (KR)

(72) Inventors: Yoon Dong Sung, Daejeon (KR); Su Bin Han, Daejeon (KR); Sea Seung Oh, Daejeon (KR); Su Yong Chae, Daejeon (KR); Gyu Duk Kim, Daejeon (KR); Seung Weon Yu, Daejeon (KR); Yujin Song, Daejeon (KR); ILoun Lee, Daejeon (KR); Sukin Park, Daejeon (KR)

(73) Assignee: KOREA INSTITUTE OF ENERGY RESEARCH (KR)

(*) Notice: Subject to any disclaimer, the term of this patent is extended or adjusted under 35 U.S.C. 154(b) by 193 days.

(21) Appl. No.: 14/523,051

(22) Filed: Oct. 24, 2014

(65) Prior Publication Data
US 2015/0115891 A1    Apr. 30, 2015

(30) Foreign Application Priority Data

Oct. 25, 2013 (KR) .................. 10-2013-0127520
Jun. 30, 2014 (KR) .................. 10-2014-0081514

(51) Int. Cl.
*B60L 11/18*    (2006.01)
(52) U.S. Cl.
CPC ....... *B60L 11/1824* (2013.01); *Y02T 10/7005* (2013.01)

(58) Field of Classification Search
CPC .................................................. B60L 11/1824
(Continued)

(56) References Cited

U.S. PATENT DOCUMENTS 5,803,215 A * 9/1998 Henze ................ B60L 11/1811
                                                    191/2
7,256,516 B2 * 8/2007 Buchanan ........... B60L 11/1811
                                                    307/62

(Continued)

FOREIGN PATENT DOCUMENTS

KR       101009485 B1    1/2011
KR     20110137675 A    12/2011
(Continued)

*Primary Examiner* — Drew A Dunn
*Assistant Examiner* — Jerry D Robbins
(74) *Attorney, Agent, or Firm* — Harness, Dickey & Pierce, P.L.C.

(57) ABSTRACT

The present disclosure provides a charging system including: at least two charging devices including at least two output units configured to supply connected automobiles with charging power, a first bus electrically connected to the output units and configured to transfer charging power to the output units, and a power processing unit configured to process power, which is supplied from a power source, using a first capacity and supply the first bus with the processed power; and a second bus configured to connect a first bus of a first charging device and a first bus of a second charging device, wherein, when a total capacity of charging power supplied to automobiles connected to the first charging device exceeds the first capacity, a part or all of lacking capacity is supplied via the second bus.

17 Claims, 26 Drawing Sheets

(58) Field of Classification Search
USPC .......................................................... 320/109
See application file for complete search history.

(56) References Cited

U.S. PATENT DOCUMENTS

| | | | |
|---|---|---|---|
| 8,643,330 B2* | 2/2014 | Nergaard | ................ B60L 1/003 |
| | | | 320/109 |
| 8,698,451 B2* | 4/2014 | King | ......................... B60L 7/12 |
| | | | 307/43 |
| 8,890,474 B2* | 11/2014 | Kim | ........................ B60L 3/003 |
| | | | 180/65.1 |
| 2008/0218121 A1* | 9/2008 | Gale | .................. B60L 11/1824 |
| | | | 320/109 |
| 2011/0074350 A1* | 3/2011 | Kocher | ............... B60L 11/1816 |
| | | | 320/109 |
| 2012/0200155 A1* | 8/2012 | McDonnell | ............... H02J 3/34 |
| | | | 307/18 |
| 2012/0267952 A1 | 10/2012 | Ballatine et al. | |
| 2012/0326504 A1* | 12/2012 | Ballantine | ............... H02J 3/006 |
| | | | 307/24 |
| 2013/0069592 A1* | 3/2013 | Bouman | ............ B60L 11/1811 |
| | | | 320/109 |
| 2013/0285627 A1 | 10/2013 | Chae et al. | |
| 2013/0293012 A1 | 11/2013 | Song et al. | |

FOREIGN PATENT DOCUMENTS

| | | |
|---|---|---|
| KR | 20120113084 A | 10/2012 |
| KR | 20130002956 A | 1/2013 |
| KR | 101261272 B1 | 5/2013 |
| KR | 20130120229 A | 11/2013 |

\* cited by examiner

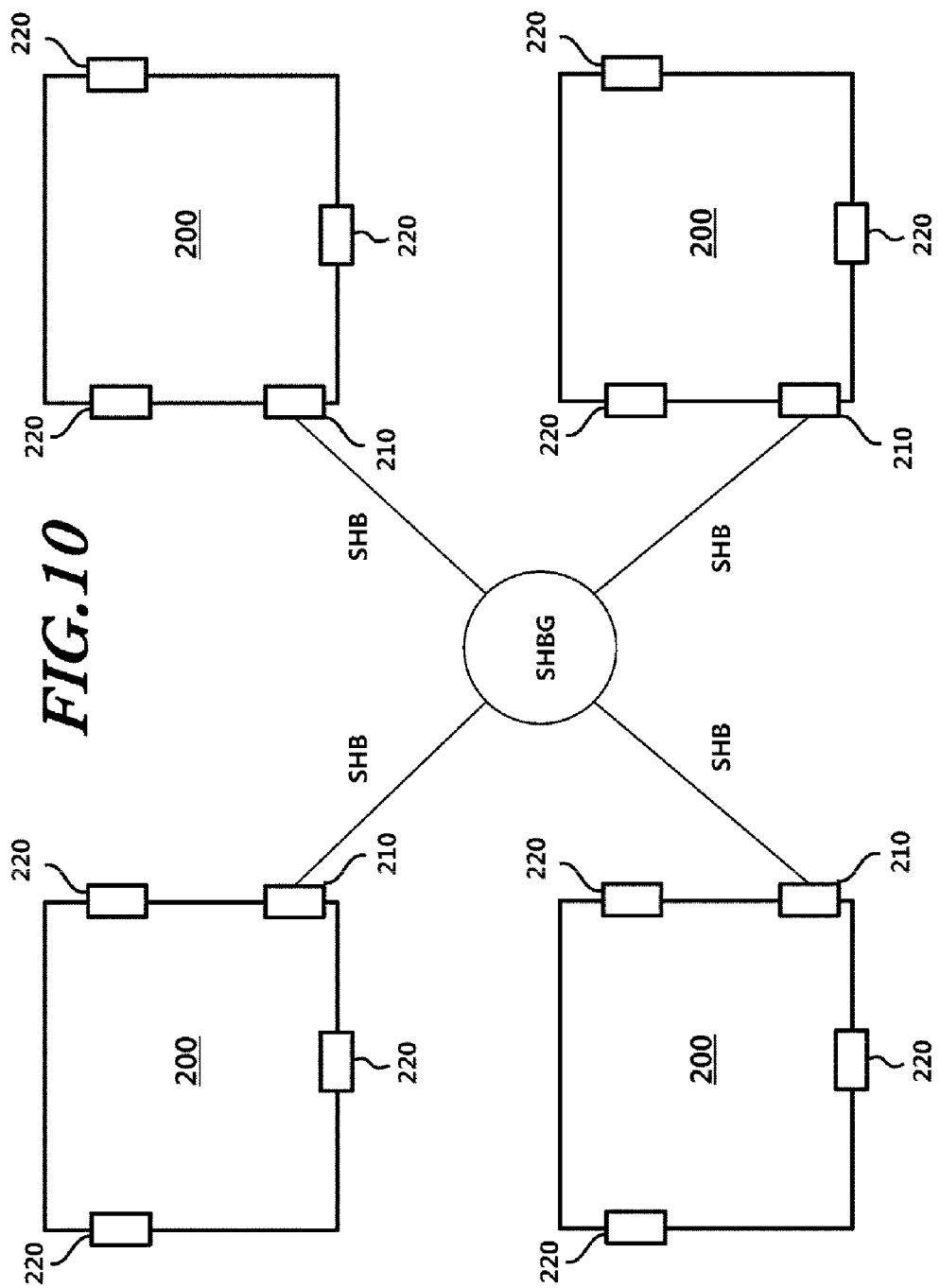

POWER-SHARING CHARGING SYSTEM, CHARGING DEVICE, AND METHOD FOR CONTROLLING THE SAME

CROSS-REFERENCE TO RELATED APPLICATION

This application claims priority from and the benefit under 35 U.S.C. §119(a) of Korean Patent Application No. 10-2013-0127520, filed on Oct. 25, 2013, and of Korean Patent Application No. 10-2014-0081514, filed on Jun. 30, 2014, which are hereby incorporated by reference for all purposes as if fully set forth herein.

BACKGROUND OF THE INVENTION

1. Field of the Invention

The present invention relates to a charging system, a charging device, and a method for controlling the same and, more particularly, to charging devices sharing power with each other.

2. Description of the Prior Art

Increasing attention to environments has been followed by extensive development of automobiles that move using electric energy. Such automobiles include electric automobiles, which are solely powered by electricity, and hybrid-type automobiles, which include both gasoline engines and electric motors.

In order for an automobile to run using electric energy, it requires a device capable of supplying it with electric energy. In the case of a fuel cell automobile, electricity, which is generated in the course of coupling between hydrogen and oxygen, is used to supply energy needed to run the automobile. The fuel cell is a kind of generator and is capable of continuously generating electric energy when supplied with fuel (e.g. hydrogen). However, an automobile that does not include such a generator as the fuel cell needs to be supplied with electric energy using an electric energy storage device, such as a battery.

A battery is a device capable of converting chemical energy into electric energy; it converts electric energy into a chemical structure in a high-energy state, through a charging process, and stores it; and it converts the chemical structure in a high-energy state into a chemical structure in a low-energy state, through a discharging process, and emits energy, which is generated through the conversion, as electric energy. Electric automobiles and hybrid automobiles employ such batteries as electric energy supply sources.

Such batteries can store only a limited amount of energy, so that automobiles need to charge their batteries frequently. Charging devices for charging automobiles, which include batteries, or charging systems, which include at least two charging devices, have recently been installed at a number of locations.

Charging systems, which include one charging device or at least two charging devices, are supplied with power from a commercial power grid, such as a system, and convert the supplied power in conformity with the voltage and characteristics of automobiles. However, there is a limit on the amount of power that can be supplied from the system to such charging devices or charging systems. Such limits largely occur in terms of hardware and policy. In terms of hardware, first, hardware devices such as a power line (cable), a circuit breaker, and a transformer have a predetermined power capacity at a contact point, which connects a charging device or a charging system with the system. Such a hardware-related limit on power capacity places a limit on the amount of power that can be supplied from the system to a charging device or a charging system.

In terms of policy, which is another aspect, a similar limit may occur. The process of charging automobiles instantly require a large amount of power, and, in terms of the system's management, such power peaks may be factors that disturb the system. For this reason, the policy-making authorities may limit the amount of power, which is supplied through a contact point leading to the system, as a policy. Such a limit can be placed by a power limiter, or through a price polity (e.g. a policy of applying a higher unit price to the amount of power consumption that exceeds a predetermined limit).

The above-mentioned limit on power supply may be a factor that interferes with efficient operation of a charging device or a charging system. It will be assumed for example that two charging devices are installed in a charging system, a number of automobiles are connected to charging device B among them, and no automobile is connected to charging device A. Then, the limited power capacity may prevent charging device B from supplying sufficient charging power to the connected automobiles. The situation in which only limited power is supplied to charging device B, while charging device A has sufficient amount of available power, is inefficient in terms of operation of the charging system.

On the other hand, besides the limit on power supply, the division of charging devices into slow charging devices and rapid charging devices is another factor that interferes with efficient operation of a charging device or a charging system. It will be assumed for example that one slow charging device and one rapid charging device are installed in a charging system. When a first automobile has already been connected to the fast charging device, a second automobile needs to be connected to the slow charging device. However, in order to rapidly charge the second automobile after charging of the first automobile is completed, the second automobile needs to be disconnected from the slow charging device and then reconnected to the rapid charging device, which is inconvenient. If the connection is not changed in this manner, the second automobile needs to continuously receive charging power from the slow charging device only until charging is completed, which lengthens the charging time. Such a division of charging devices into slow charging devices and rapid charging devices results in inconvenient change of charging connection of the following automobile or inefficient charging, which uses the slow charging device even when the rapid charging device is available.

SUMMARY OF THE INVENTION

In this background, an aspect of the present invention is to provide a technology enabling at least two charging devices, which have limited power capacities, to share power with each other so that, when needed, one charging device can supply charging power more than the limited power capacity.

Another aspect of the present invention is to provide a technology enabling a charging device to supply both slow charging power and rapid charging power and to convert slow charging power and rapid charging power to each other.

In accordance with an aspect of the present invention, there is provided a charging system including: at least two charging devices including at least two output units configured to supply connected automobiles with charging power, a first bus electrically connected to the output units and configured to transfer charging power to the output units, and a power processing unit configured to process power, which is supplied from a power source, using a first capacity and supply the first bus with the processed power; and a second bus configured to connect a first bus of a first charging device and a first bus of a second charging device, wherein, when a total capacity of charging power supplied to automobiles connected to the first charging device exceeds the first capacity, a part or all of lacking capacity is supplied via the second bus.

In accordance with an aspect of the present invention, there is provided a method for controlling a first charging device including at least two output units configured to supply connected automobiles with charging power, the first charging device being supplied with power from a second charging device via a shared bus, the method including: making a first comparison by comparing an available charging capacity of the first charging device with an amount of rapid charging; making a second comparison, when the available charging capacity of the first charging device is smaller than the amount of rapid charging, by comparing the difference between two values with an available charging capacity of the second charging device; displaying rapid charging on by at least one output unit when a first condition, in which the available charging capacity of the first charging device is equal to or larger than the amount of rapid charging in the making a first comparison, or a second condition, in which the difference between the available charging capacity of the first charging device and the amount of rapid charging is equal to or smaller than the available charging capacity of the second charging device in the making a second comparison, is satisfied; and displaying a limited charging condition by the at least one output unit when the first condition and the second condition are not satisfied.

In accordance with an aspect of the present invention, there is provided a charging device including: at least two output units configured to supply connected automobiles with charging power; a first bus electrically connected to the output units and configured to transfer charging power to the output units; and a power processing unit configured to process power, which is supplied from a power source, using a first capacity and supply the first bus with the processed power, wherein, when the total capacity of charging power supplied to connected automobiles exceeds the first capacity, a part or all of lacking capacity is supplied via a second bus connected to a different charging device.

As described above, an aspect of the present invention is advantageous in that at least two charging devices, which have limited power capacities, share power with each other so that one charging device can supply charging power more than the limited power capacity.

Another aspect of the present invention is advantageous in that a charging device supplies both slow charging power and rapid charging power so that the automobile can switch between slow charging and rapid charging within the range of available charging power and conduct charging accordingly.

BRIEF DESCRIPTION OF THE DRAWINGS

The above and other objects, features and advantages of the present invention will be more apparent from the following detailed description taken in conjunction with the accompanying drawings, in which:

FIG. 10 illustrates a first example of connection of at least three charging devices.

DETAILED DESCRIPTION OF THE EXEMPLARY EMBODIMENTS

Figure 1:
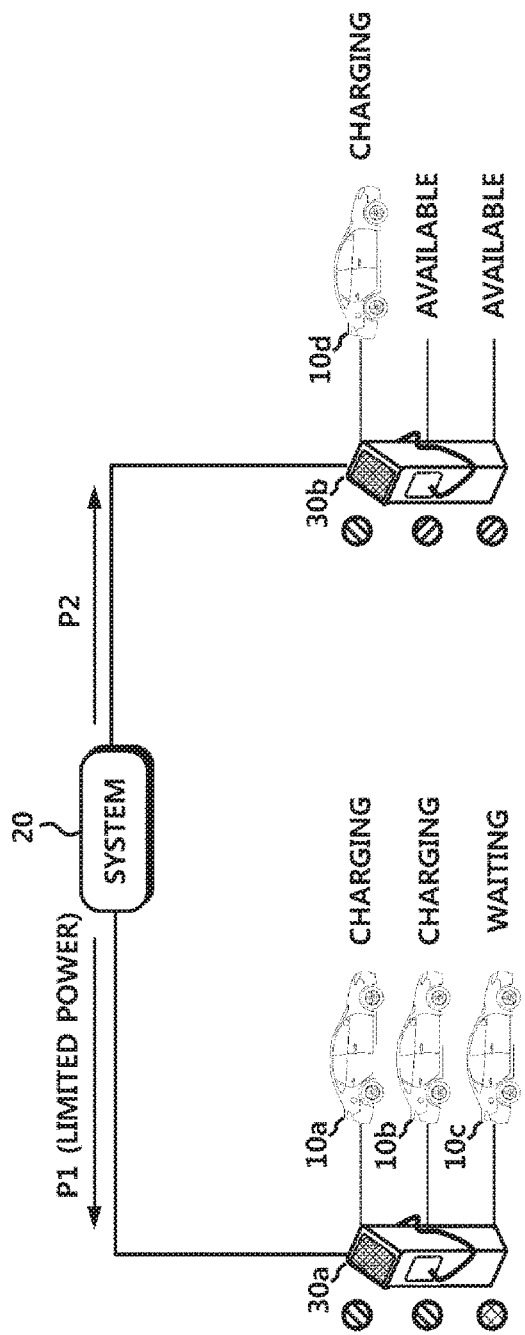
FIG. 1 is a diagram illustrating a charging system, in which two charging devices are operated independently.

Hereinafter, exemplary embodiments of the present invention will be described in detail with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 is a diagram illustrating a charging system, in which two charging devices are operated independently.

Referring to FIG. 1, three automobiles 10a, 10b, 10c are connected to charging device A 30a, and one automobile 10d is connected to charging device B 30b.

Meanwhile, two automobiles 10a, 10b of the three automobiles connected to charging device A 30a and one automobile 10d connected to charging device B 30b are in a charging state (CHARGING), while one automobile 10c connected to charging device A 30a is in a charging awaiting state (WAITING).

The reason one automobile 10c is in a charging awaiting state (WAITING) in charging device A 30a is because there is a limit on the power P1 that is supplied from a system 20 to charging device A 30a.

As described above, there is a predetermined limit on the power that can be supplied from the system to the charging devices 30a, 30b, and such a limit largely occurs in terms of hardware and policy. In terms of hardware, first, hardware devices such as a power line (cable), a circuit breaker, and a transformer have a predetermined power capacity at a contact point, which connects the charging devices 30a, 30b and the system. Such a hardware-related limit on power capacity places a limit on the amount of power that can be supplied from the system to the charging devices 30a, 30b.

In terms of policy, which is another aspect, a similar limit may occur. The process of charging automobiles instantly requires a large amount of power, and, in terms of the system's management, such power peaks may be factors that disturb the system. For this reason, the policy-making authorities may limit the amount of power, which is supplied through a contact point leading to the system, as a policy. Such a limit can be placed by a power limiter, or through a price polity (e.g. a policy of applying a higher unit price to the amount of power consumption that exceeds a predetermined limit).

When such a power limit is PL, the power supplied to charging device A 30a in FIG. 1 is P1, and the power supplied to charging device B 30b is P2, the relationship among PL, P1, and P2 is given by equation (1) below:

$$P1=PL,$$

$$P2<PL \quad (1)$$

An embodiment of a charging system will hereinafter be described, which, when power P2 supplied to charging device B 30b is smaller than the power limit PL as in equation (1), supplies charging device A 30a with available power of charging device B 30b so that charging device A 30a can supply all of the three automobiles 10a, 10b, 10c with charging power.

Figure 2:
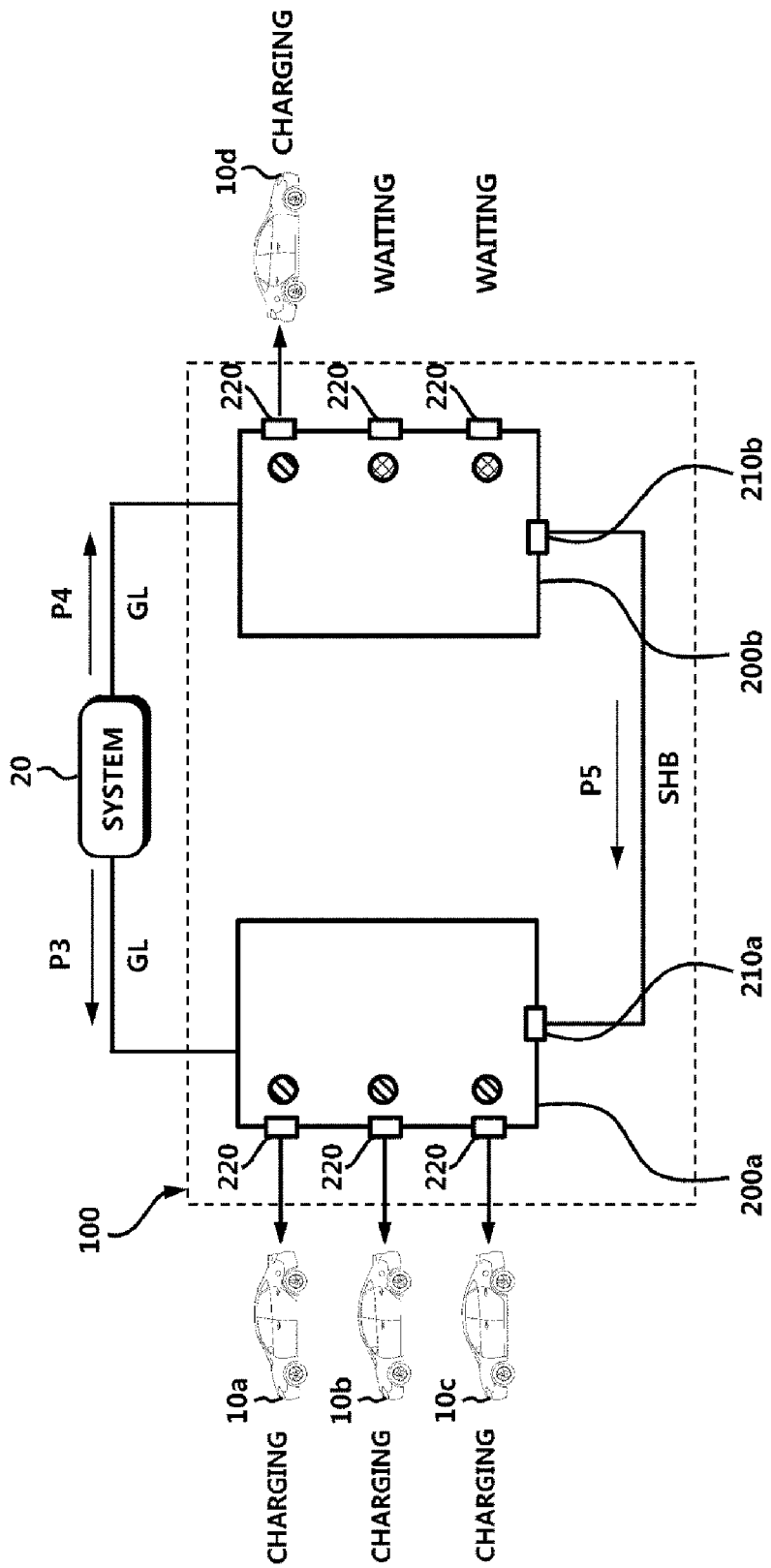
FIG. 2 illustrates a configuration of a charging system according to an embodiment of the present invention, as well as its periphery.

FIG. 2 illustrates a configuration of a charging system according to an embodiment of the present invention, as well as its periphery.

Referring to FIG. 2, the charging system 100 includes a first charging device 200a and a second charging device 200b, each of which includes three output units 220 and one bus connection unit 210a or 210b. And the bus connection unit 210a of the first charging device 200a and the bus connection unit 210b of the second charging device 200b are connected via a shared bus SHB.

Comparing FIG. 2 and FIG. 1, in the charging system 100 according to an embodiment, the first charging device 200a has three automobiles 10a, 10b, 10c connected thereto as in the case of charging device A 30a, and the second charging device 200b has one automobile 10d connected thereto as in the case of charging device B 30b.

By the way, charging device A 30a in FIG. 1 can supply only two automobiles 10a, 10b with charging power, while the first charging device 200a in FIG. 2 is supplying all of the three automobiles 10a, 10b, 10c with charging power.

Such a difference results from the shared bus SHB that connects the first charging device 200a and the second charging device 200b.

In the embodiment illustrated in FIG. 2, the power P3 supplied from the system 20 to the first charging device 200a may be equal to or less than the power P1 supplied from the system 20 to charging device A 30a in FIG. 1.

The reason the first charging device 200a can supply more charging power than charging device A 30a although the power P3 supplied to the first charging device 200a is equal to or less than the power P1 supplied to charging device A 30a is because the first charging device 200a is supplied with power P5 from the second charging device 200b via the shared bus SHB.

The second charging device 200b is supplied with more power P4 from the system 20 than charging power that is supplied to one automobile 10d connected to the charging device, and supplies the first charging device 200a with power P5, which is a portion of the power P4 that is not used as charging power, via the shared bus SHB.

This configuration enables the first charging device 200a of the charging system 100 to supply more charging power P3+P5 than the power P3 supplied from the system 20.

$$\text{Charging power of first charging device}=P3+P5,$$

$$(P3+P5)>(PL) \quad (2)$$

Although it is assumed in the description of an embodiment of the present invention that the charging devices are supplied with power from the system 20, the assumption is solely for the sake of convenience of description, and the charging devices can also be supplied with power, which is necessary for charging, from a different power source. For example, the charging system 100 may be included in a microgrid, which may include a distributed power source, such as a fuel cell generator or a wind power generator, therein. In this case, the charging system 100 can be supplied with power, which is necessary for charging, from the fuel cell generator or the wind power generator of the microgrid.

Figure 3:
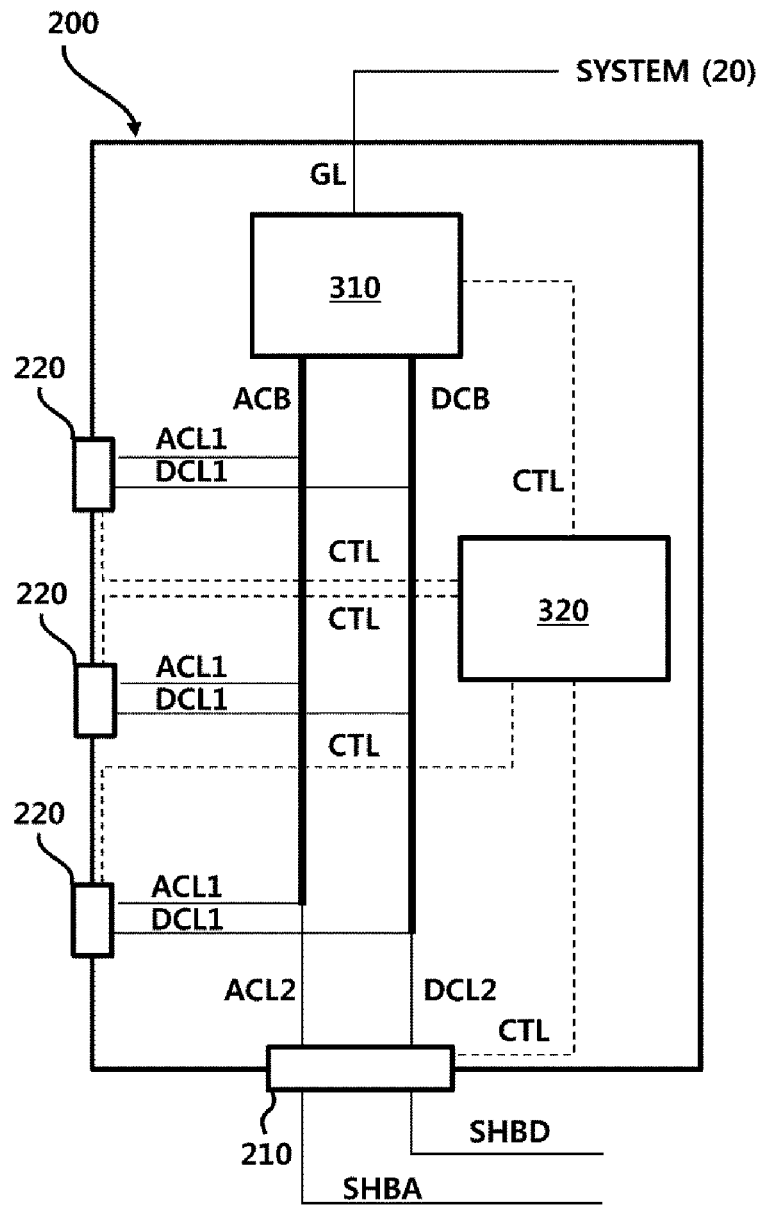
FIG. 3 illustrates a configuration of a charging device according to an embodiment.

FIG. 3 illustrates a configuration of a charging device according to an embodiment.

The charging device 200 illustrated in FIG. 3 to FIG. 11 is an example of the first charging device 200a and the second charging device 200b illustrated in FIG. 2.

Referring to FIG. 3, the charging device 200 may include a power processing unit 310, a control unit 320, at least two output units 220, and a bus connection unit 210.

The control unit 320 is connected to the power processing unit 310, the output units 220, and the bus connection unit 210 via control lines CTL and is configured to control the power processing unit 310, the output units 220, and the bus connection unit 210. Control may also be performed by each of the power processing unit 310, the output units 220, and the bus connection unit 210; and, in this case, the control unit 320 can perform the other kinds of control that are not performed by the power processing unit 310, the output units 220, and the bus connection unit 210. It will be assumed in the following description that control is performed by each of the power processing unit 310, the output units 220, and the bus connection unit 210, but it is also possible, as described above, for the control unit 320 to perform such controls and transmit only control signals to each of them.

The power processing unit 310 is configured to process power, which is supplied from a power source (e.g. system), and supplies a first bus ACB, DCB with the power. The first bus may be composed of at least one sub-bus, and, in FIG. 3, the first bus includes a first AC bus ACB, which supplies AC power, and a first DC bus DCB, which supplies DC power. In addition, the first bus ACB, DCB is connected to each output unit 220 via an output line ACL1, DCL1, so that power processed by the power processing unit 310 is delivered to each output unit 220.

The power processing unit 310 may include a converter that converts the type of power (e.g. AC/DC converter that converts AC power to DC power). Alternatively, the power processing unit 310 may further include a circuit that controls the quality of power (e.g. EMC (Electro-Magnetic Compatibility) filter, PFC (Power Factor Correction) circuit). In addition, the power processing unit 310 may further include a safety circuit (e.g. surge circuit, varistor circuit, circuit breaker).

Such components included in the power processing unit 310 (e.g. converter, power quality control circuit, safety circuit) have ratings. For example, in the case of a converter that can be included in the power processing unit 310, the converter is composed of a number of switching semiconductors, which do not function normally above a predetermined current or a predetermined voltage.

Since respective components included in the power processing unit 310 have ratings as described above, there is a limit on the capacity that can be processed by the power processing unit 310. The capacity of power processed by the power processing unit 310 will hereinafter be referred to as a first capacity.

The size of the first capacity is determined by the minimum rated capacities of components included in the power processing unit 310. For example, when the EMC filter has a rated capacity of 10 KW, and the converter has a rated capacity of 7.7 KW, the size of the first capacity is determined as 7.7 KW according to the rated capacity of the converter.

Figure 4A:
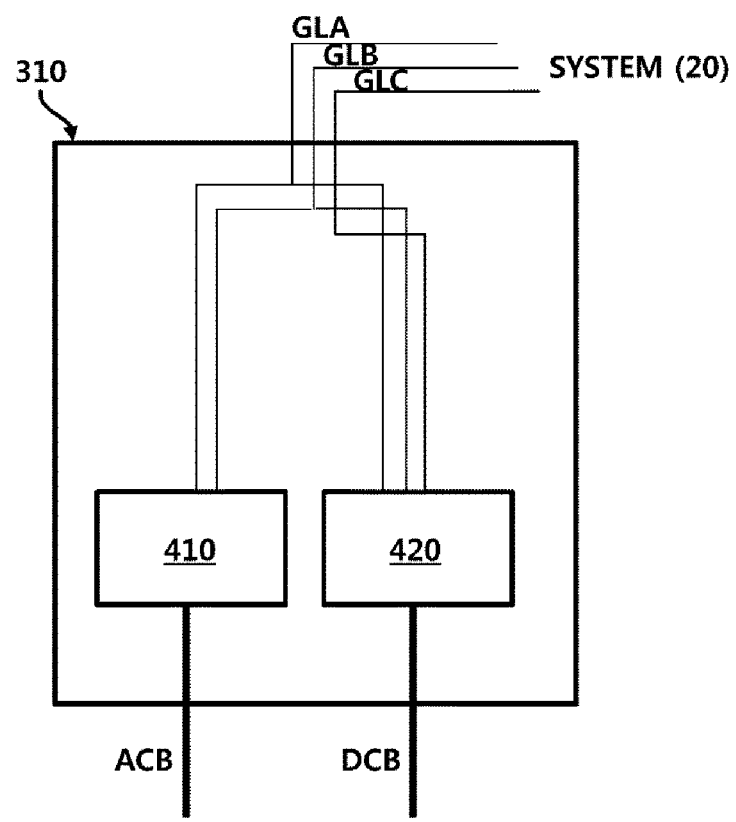
FIG. 4A and FIG. 4B illustrate examples of the power processing unit.
Figure 4B:
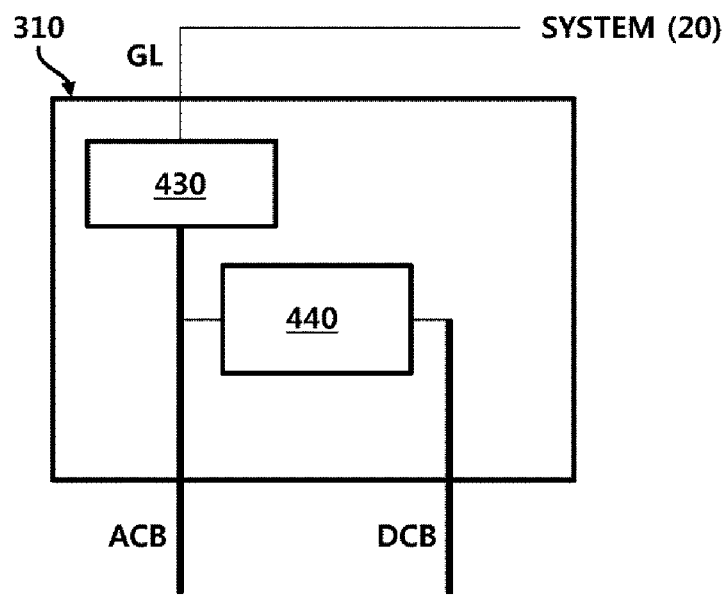

FIG. 4A and FIG. 4B illustrate examples of the power processing unit.

FIG. 4A illustrates an exemplary configuration of the power processing unit 310, which includes an AC supply unit 410 configured to process power from the system 20 into AC power and a DC supply unit 420 configured to process power from the system 20 into DC power.

In this case, power from the system 20 may be composed of three phases, and the DC supply unit 420 can convert the three-phase power into DC power and supply the first DC bus DCB with the DC power. Three-phase power is generally known to be advantageous to making high-voltage DC power. When an inverter is applied, which is widely used to convert three-phase power into DC power, the DC supply unit 420 can supply the first DC bus DCB with high-voltage DC power of 380 VDC-400 VDC.

The AC supply unit 410 is configured to supply the first AC bus ACB with power, which has two phases among the three phases. Accordingly, among the three-phase lines GLA, GLB, GLC, two lines GLA, GLB are connected to the AC supply unit 410.

FIG. 4B illustrates another exemplary configuration of the power processing unit 310, which may include a preprocessing unit 430 configured to preprocess power from the system 20 and a bidirectional AC/DC converter 440 configured to convert power of the first AC bus ACB into power of the first DC bus DCB or convert power of the first DC bus DCB into power of the first AC bus ACB.

The preprocessing unit 430 may include the above-described power quality control circuit (e.g. EMC filter) or safety circuit (e.g. circuit breaker).

Power, the quality and safety of which have been controlled by the preprocessing unit 430, is supplied to the first AC bus ACB, which is an AC power bus.

Power of the first DC bus DCB can be supplied from the first AC bus ACB via the bidirectional AC/DC converter 440.

On the other hand, power of the first DC bus DCB can be supplied from a different charging device via a shared bus SHB (in FIG. 2), and the bidirectional AC/DC converter 440 can convert power of the first DC bus DCB into AC power and supply the first AC bus ACB with the AC power.

By means of the AC/DC converter 440, power of the first DC bus DCB and power of the first AC bus ACB can be shared with each other. Although such a configuration of the bidirectional AC/DC converter 440 is not illustrated in FIG. 4A, such a bidirectional AC/DC converter 440 can be added to the example illustrated in FIG. 4A.

On the other hand, power processed by the power processing unit 310 is delivered to the output units 220 via the first bus ACB, DCB and the output lines ACL1, DCL1.

Figure 5:
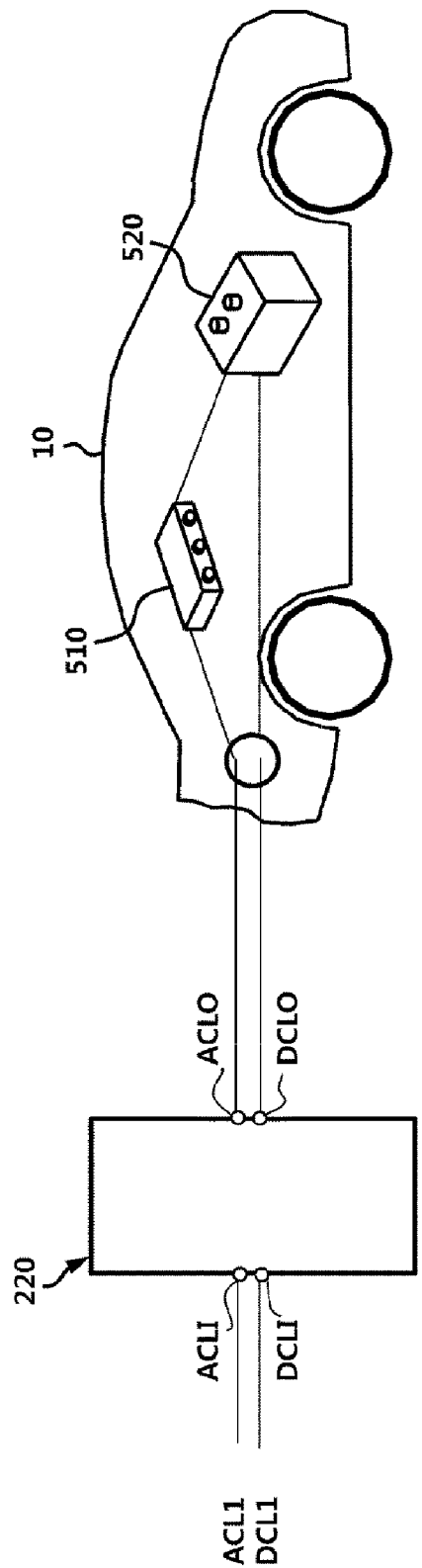
FIG. 5 illustrates terminals of an output unit and automobile parts connected to respective terminals.

FIG. 5 illustrates terminals of an output unit and automobile parts connected to respective terminals.

Referring to FIG. 5, the output unit 220 includes an input connector including an AC input terminal ACLI and a DC input terminal DCLI, and may include an output connector including an AC output terminal ACLO and a DC output terminal DCLO.

The AC input terminal ACLI is connected to the AC output line ACL1 to receive AC power, which is supplied via the first AC bus ACB, and the DC input terminal DCLI is connected to the DC output line DCL1 to receive DC power, which is supplied via the first DC bus DCB.

In addition, the AC input terminal ACLI is directly/indirectly connected to the AC output terminal ACLO to transfer inputted AC power to the AC output terminal ACLO, and the DC input terminal DCLI is directly/indirectly connected to the DC output terminal DCLO to transfer inputted DC power to the DC output terminal DCLO.

The AC output terminal ACLO is configured to supply AC power to an onboard charger 510 of the automobile 10. The onboard charger 510 is mounted on the automobile 10 and is configured to convert power, which is supplied from the outside, into power suitable for the battery 520.

The power processing capacity is generally proportional to the volume of the power device, and the power processing capacity of the onboard charger 510, which is not supposed to occupy a large space in the automobile 10, is therefore limited to a predetermined level or lower.

Accordingly, charging through the onboard charger 510 is limited to a predetermined rate or less, and, in this regard, the mode of charging through the onboard charger 510 is referred to as a slow charging mode.

On the other hand, the DC output terminal DCLO is configured to supply DC power to the battery 520 of the automobile 10. Charging via the onboard charger 510 is limited to a predetermined rate or less, as described above, and the output unit 220 can directly connect the DC output terminal DCLO to the battery 520 of the automobile 10 and perform rapid charging.

When there is a separation between a slow charging device, which supplies power via the onboard charger 510, and a rapid charging device, which supplies DC power directly to the battery 520, there may be a predetermined degree of limit on adjustment of the amount of charging.

For example, when the amount of charging can be adjusted from 1 KW to 7.7 KW in the case of slow charging, and the amount of charging can be adjusted from 7.7 KW to 50 KW in the case of rapid charging, the amount of charging cannot be changed to 7.7 KW or more in the case of an automobile 10 connected to the slow charging device, and the mount of charging cannot be changed to 7.7 KW or less in the case of an automobile 10 connected to the rapid charging device.

Users may use the slow charging device, if necessary, but the slow charging device is used, in most cases, due to the limit of charging capacity. For example, when a charging station has one slow charging device and one rapid charging device, and one user is already using the rapid charging device, another user has no choice but to use the slow charging device.

According to the prior art, however, the automobile 10, which is connected to the slow charging device due to the limit of charging capacity, may be unable to change the amount of charging to rapid charging, even if the charging capacity has become available sufficiently.

In contrast, the output unit 220 illustrated in FIG. 5 includes both an AC output terminal ACLO and a DC output terminal DCLO and can switch between the slow charging mode and the rapid charging mode, as needed, and adjust the amount of charging.

Figure 6A:
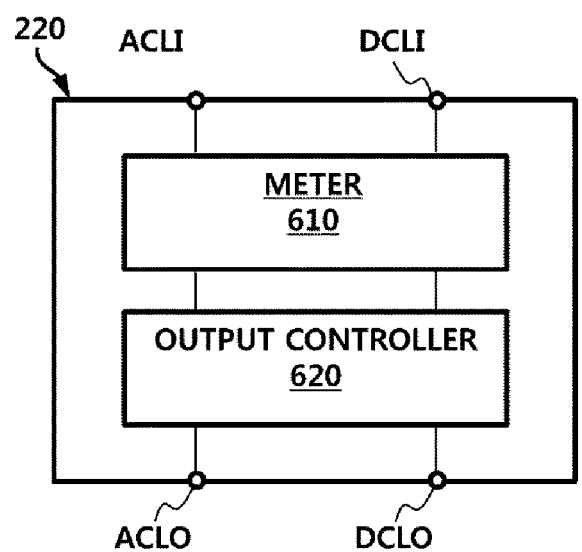
FIG. 6A and FIG. 6B illustrate examples of the output unit.
Figure 6B:
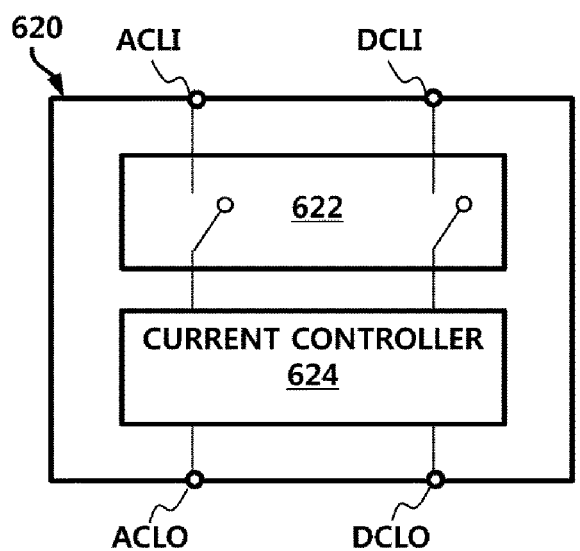

FIG. 6A and FIG. 6B illustrate examples of the output unit.

Referring to FIG. 6A, the output unit 220 may include a meter 610 configured to measure the amount of outputted charging power and an output controller 620 configured to control the mount of outputted charging power.

The output controller 620 can supply charging power to the AC output terminal ACLO within a charging power range in the slow charging mode and supply charging power to the DC output terminal DCLO within a charging power range in the rapid charging mode. In this case, the maximum value of the charging power range of the rapid charging mode is larger than the maximum value of the charging power range of the slow charging mode.

Referring to FIG. 6B, the output controller 620 may internally include a charging mode selection unit 622 and a current controller 624.

The charging mode selection unit 622 can select one charging mode between the slow charging mode and the rapid charging mode described above. When the charging mode selection unit 622 selects the slow charging mode, the AC input terminal ACLI and the AC output terminal ACLO are connected so that the output unit 220 supplies the automobile 10 with AC power. On the other hand, when the charging mode selection unit 622 selects the rapid charging mode, the DC input terminal DCLI and the DC output terminal DCLO are connected so that the output unit 220 supplies the automobile 10 with DC power.

The charging mode selection by the charging mode selection unit 622 can be made automatically according to the range of charging power. For example, when the range of charging power to be supplied to the automobile 10 corresponds to the slow charging mode, the charging mode selection unit 622 can turn on the AC output terminal ACLO, and, when the range of charging power to be supplied to the automobile 10 corresponds to the rapid charging mode, the charging mode selection unit 622 can turn on the DC output terminal DCLO.

The current controller 624 is configured to control the amount of charging current outputted via the output terminals ACLO, DCLO. Since the battery 520 has a constant voltage, the current needs to be controlled to control charging power supplied to the battery 520. To this end, the current controller 624 controls the current outputted to the output terminals ACLO, DCLO.

The current controller 624 may separately have an AC current control module (not illustrated), which is related to the slow charging mode, and a DC current control module (not illustrated). In this case, the AC current control module (not illustrated) can control the amount of AC current flowing between the AC input terminal ACLI and the AC output terminal ACLO, and the DC current control module (not illustrated) can control the amount of DC current flowing between the DC input terminal DCLI and the DC output terminal DCLO.

Meanwhile, the charging device 200 may include a bus connection unit 210 to share power with another charging device.

Referring back to FIG. 3, the AC shared line ACL2, which is connected to the first AC bus ACB, is connected to the bus connection unit 210, and the AC shared bus SHBA is connected to the bus connection unit 210, so that the first AC bus ACB and the AC shard bus SHBA are electrically connected. Likewise, the DC shared line DCL2, which is connected to the first DC bus DCB, is connected to the bus connection unit 210, and the DC shared bus SHED is connected to the bus connection unit 210, so that the first DC bus DCB and the DC shard bus SHED are electrically connected.

Although the shared bus SHB is composed of an AC shared bus SHBA and a DC shared bus SHED in the example illustrated in FIG. 3 so that AC power and DC power are exchanged with each other between charging devices 200, the shared bus SHB may alternatively be composed of a single AC shared bus SHBA or a single DC shared bus SHED, besides such an embodiment.

Figure 7A:
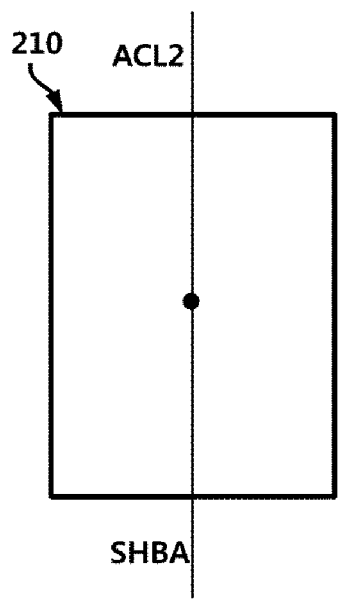
FIG. 7A, FIG. 7B, and FIG. 7C illustrate examples of the bus connection unit.
Figure 7B:
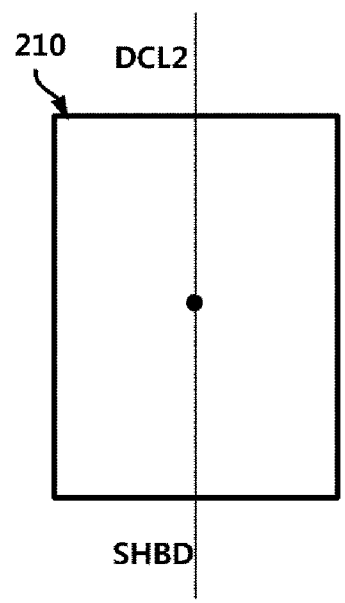
Figure 7C:
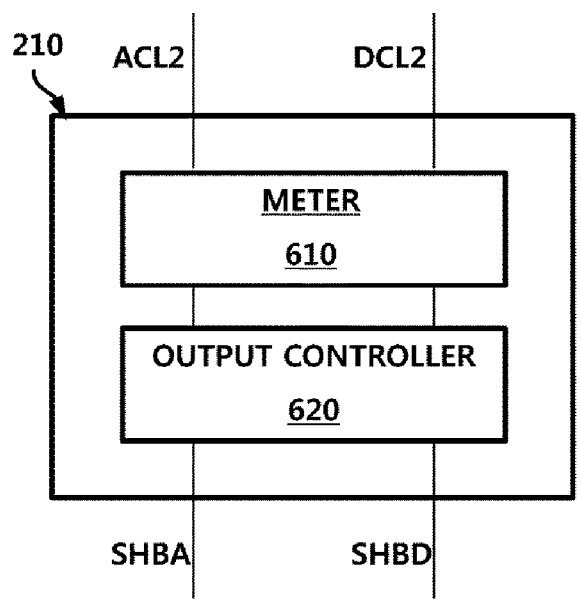

FIG. 7A, FIG. 7B, and FIG. 7C illustrate examples of the bus connection unit.

In FIG. 7A and FIG. 7B, the bus connection unit 210 is a junction box, which includes no other component, and the shared line ACL2 or DCL2 and the shared bus SHBA or SHED are directly connected.

In FIG. 7A, the bus connection unit 210 solely connects the AC shared line ACL2 and the AC shared bus SHBA, and, in FIG. 7B, the bus connection unit 210 solely connects the DC shared line DCL2 and the DC shared bus SHED. Such examples can create a synergy effect together with the bidirectional AC/DC converter 440 illustrated in FIG. 4B. For example, when the shared bus SHB is connected only by the AC shared bus SHBA, and the bus connection unit 210 has a configuration as illustrated in FIG. 7A, the bidirectional AC/DC converter 440 converts AC power, which is supplied from a different charging device via the AC shared bus SHBA, into DC power so that both the first AC bus ACB and the second DB bus DCB can be supplied with power from a different charging device.

Referring to FIG. 7C, on the other hand, the bus connection unit 210 may further include a meter 610 and an output controller 620.

Using the meter 610, the charging device 200 can measure the amount of power exchanged with a different charging device.

The output controller 620 is configured to control the amount of power supplied to the shared bus SHB, and can limit the amount of power, which leaks to a different charging device, to a predetermined extent.

Meanwhile, although the output unit 220 and the bus connection unit 210 are given different reference numerals for convenience of description, both components may have substantially the same hardware configurations. For example, the charging device 200 may include four output units 220, one of which may have output terminals (e.g. AC output terminal ACLO and DC output terminal DCLO) connected to the shared bus SHB.

When there is a large distance between the charging devices 200, on the other hand, the shared bus SHB may be configured using MVDC (Medium Voltage DC) or HVDC (High Voltage DC), in order to reduce power transmission loss.

Figure 8:
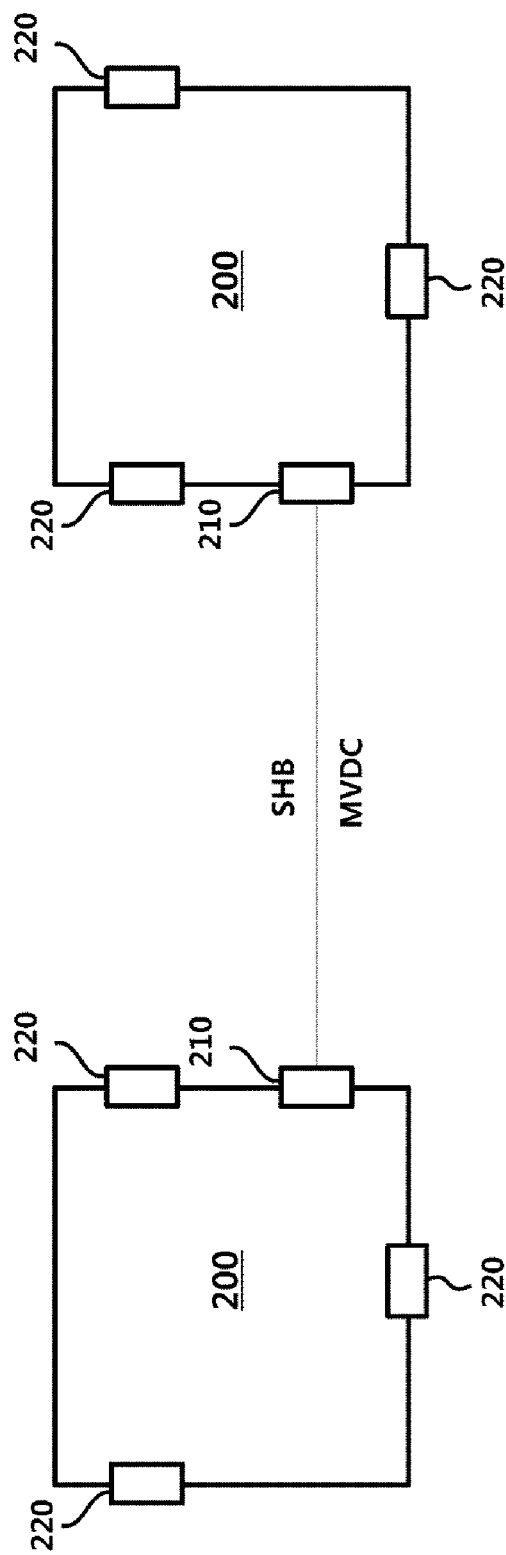
FIG. 8 illustrates connection of charging devices by MVDC (Medium Voltage DC).
Figure 9A:
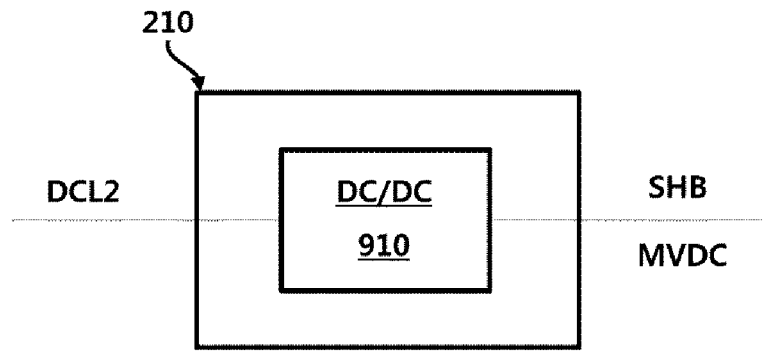
FIG. 9A and FIG. 9B illustrate examples of the bus connection unit of the exemplary charging device illustrated in FIG. 8.
Figure 9B:
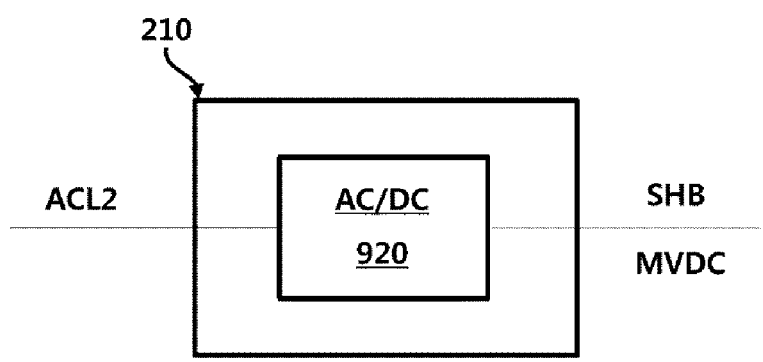

FIG. 8 illustrates connection of charging devices by MVDC (Medium Voltage DC), and FIG. 9A and FIG. 9B illustrate examples of the bus connection unit of the charging devices illustrated in FIG. 8.

Referring to FIG. 9A, the bus connection unit 210 is connected to a DC shared line DCL2. Accordingly, the bus connection unit 210 includes a DC/DC converter 910 to convert DC power of the shared bus SHB, which is configured using MVDC, into DC power that conforms to the DC shared line DCL2. It is also possible for the DC/DC converter 910 to have a bidirectional property so that DC power of the DC shared line DCL2 is transferred to the MVDC.

For another example, referring to FIG. 9B, the bus connection unit 210 is connected to an AC shared line ACL2. Accordingly, the bus connection unit 210 includes an AC/DC converter 920 to convert DC power of the shared bus SHB, which is configured using MVDC, into AC power that conforms to the AC shared line ACL2. It is also possible for the AC/DC converter 920 to have a bidirectional property so that AC power of the AC shared line ACL2 is transferred to the MVDC.

Although two charging devices 200 are connected by a shared bus SHB in the example illustrated in FIG. 8, the present invention is not limited thereto, and three or more charging devices 200 can be connected by a shared bus SHB.

FIG. 10 illustrates a first example of connection of at least three charging devices.

Referring to FIG. 10, shared buses SHB can be connected to each other via a shared bus grid SHBG. The shared bus grid SHBG is a kind of microgrid. The shared buses SHB, which are connected to respective charging devices 200, are connected to the shared bus grid SHBG so that all charging devices 200 can share power with each other.

Figure 11:
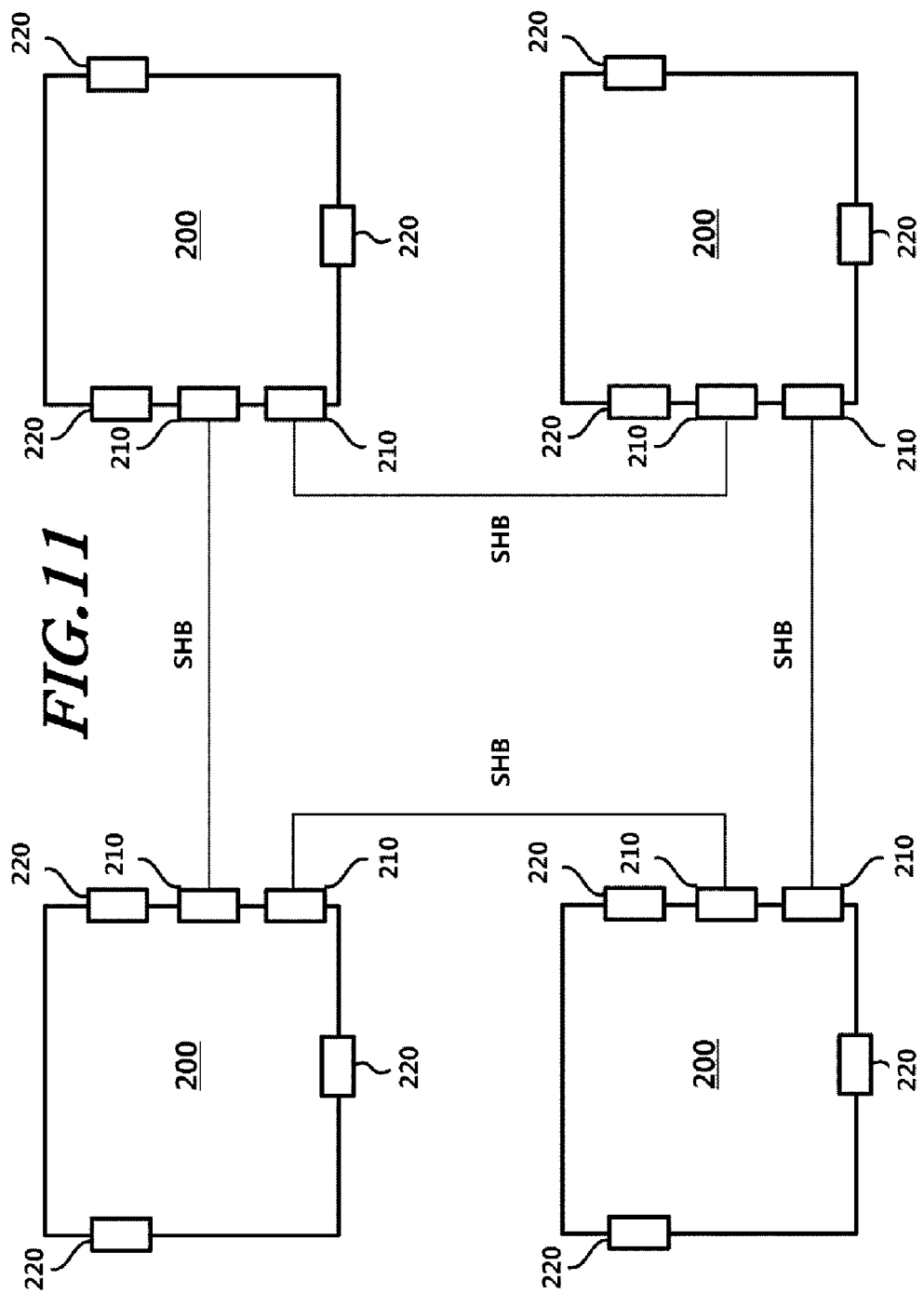
FIG. 11 illustrates a second example of connection of at least three charging devices.

FIG. 11 illustrates a second example of connection of at least three charging devices.

Referring to FIG. 11, two charging devices 200 are connected one-to-one via a shared bus SHB. Accordingly, each charging device 200 includes two bus connection units 210 to connect with two different charging devices 200, respectively.

Meanwhile, a charging device 200 can be supplied with power not only from the system 20, but also from another charging device, and, as a result, the method for controlling the charging device, particularly the method for indicating the amount of available power, may be different from the case of a conventional charging device 200.

Figure 12:
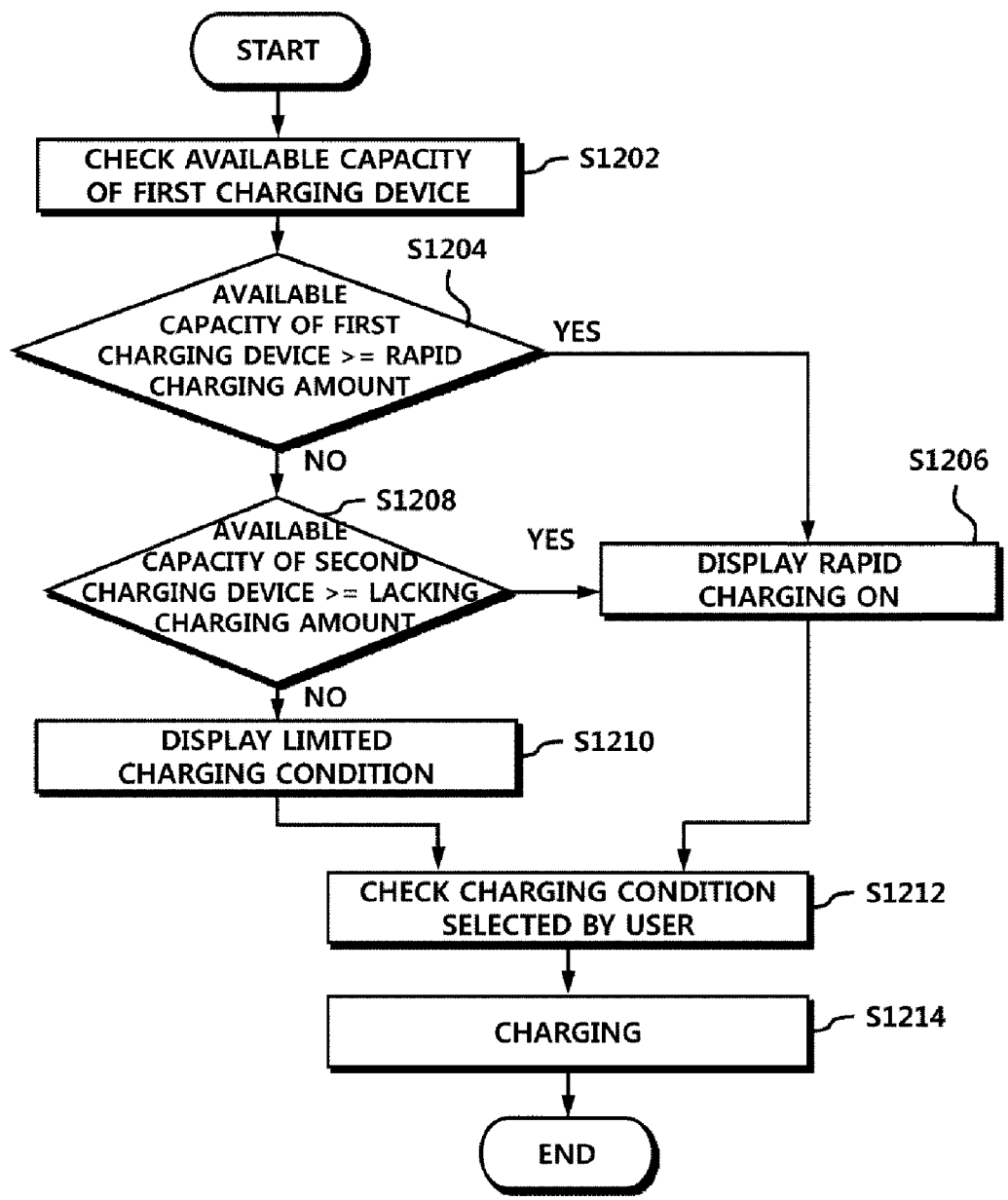
FIG. 12 is a flowchart of a method for controlling charging devices.

FIG. 12 is a flowchart of a method for controlling charging devices.

Referring to FIG. 12, initially, the first charging device 200a checks its available charging capacity (S1202). For example, when the first charging device 200a, which includes a total of three output units 220, has a total capacity of 100 KW, and two output units 220 among the three output units 220 are conducting rapid charging corresponding to 40 KW, respectively, the available charging capacity of the first charging device 200a is 20 KW.

Then, the first charging device 200a compares the available charging capacity with the amount of rapid charging (S1204).

When the available charging capacity is confirmed to be equal to or larger than the amount of rapid charging as a result of the comparison, the first charging device 200a causes the remaining one output unit 220, which is not conducting charging, to display RAPID CHARGING ON (S1206). The output unit 220 may further include a display device for displaying RAPID CHARGING ON.

On the other hand, when the available charging capacity is confirmed by the comparison to be less than the rapid charging amount, the first charging device 200a communicates with the second charging device 200b to check the available charging capacity of the second charging device 200b and compares the available charging capacity of the second charging device 200b with the lacking amount of charging (S1208).

When the available charging capacity of the first charging device 200a is 20 KW, but the amount of rapid charging is 40 KW in the above-mentioned example, the first charging device 200a performs step S1208. In this regard, the lacking amount of charging is a difference between the amount of rapid charging and the available charging capacity of the first charging device 200a.

When it is confirmed in step S1208 that the available charging capacity of the second charging device 200b is equal to or larger than the lacking amount of charging, the first charging device 200a causes the remaining one output unit 220, which is not conducting charging, to display RAPID CHARGING ON (S1206). This means that the first charging device 200a considers not only its own available charging capacity, but also the available charging capacity of the second charging device 200b and thereby drives the display device.

When it is confirmed in step S1208 that the available charging capacity of the second charging device 200b is less than the lacking amount of charging, the first charging device 200a displays a limited charging condition (S1210). For example, when the available charging capacity of the second charging device 200b is 0KW, and the lacking amount of charging is 20 KW, the first charging device 200a indicates that charging is possible up to 20 KW. In this case, the first charging device 200a can display SLOW CHARGING ON, as needed. The amount of slow charging is then 20 KW or less.

Thereafter, when the charging condition selected by the user is confirmed (S1212), the charging device 200 initiates charging (S1214).

As described above, an embodiment of the present invention is advantageous in that, according to an aspect, at least two charging devices, which have limited power capacities, share power with each other so that one charging device can supply charging power more than the limited power capacity.

Furthermore, according to another aspect, an embodiment of the present invention is advantageous in that a charging device supplies both slow charging power and rapid charging power so that an automobile can switch between slow charging and rapid charging, within the range of available charging power, and conduct charging accordingly.

Meanwhile, the bus connection unit 210 may further include a power transmitter, through which each charging device can transmit a part or all of the remaining capacity, after charging power supplied to automobiles is subtracted from the total capacity, to another charging device. An embodiment in which the bus connection unit 210 includes a power transmitter will now be described in more detail.

Figure 13:
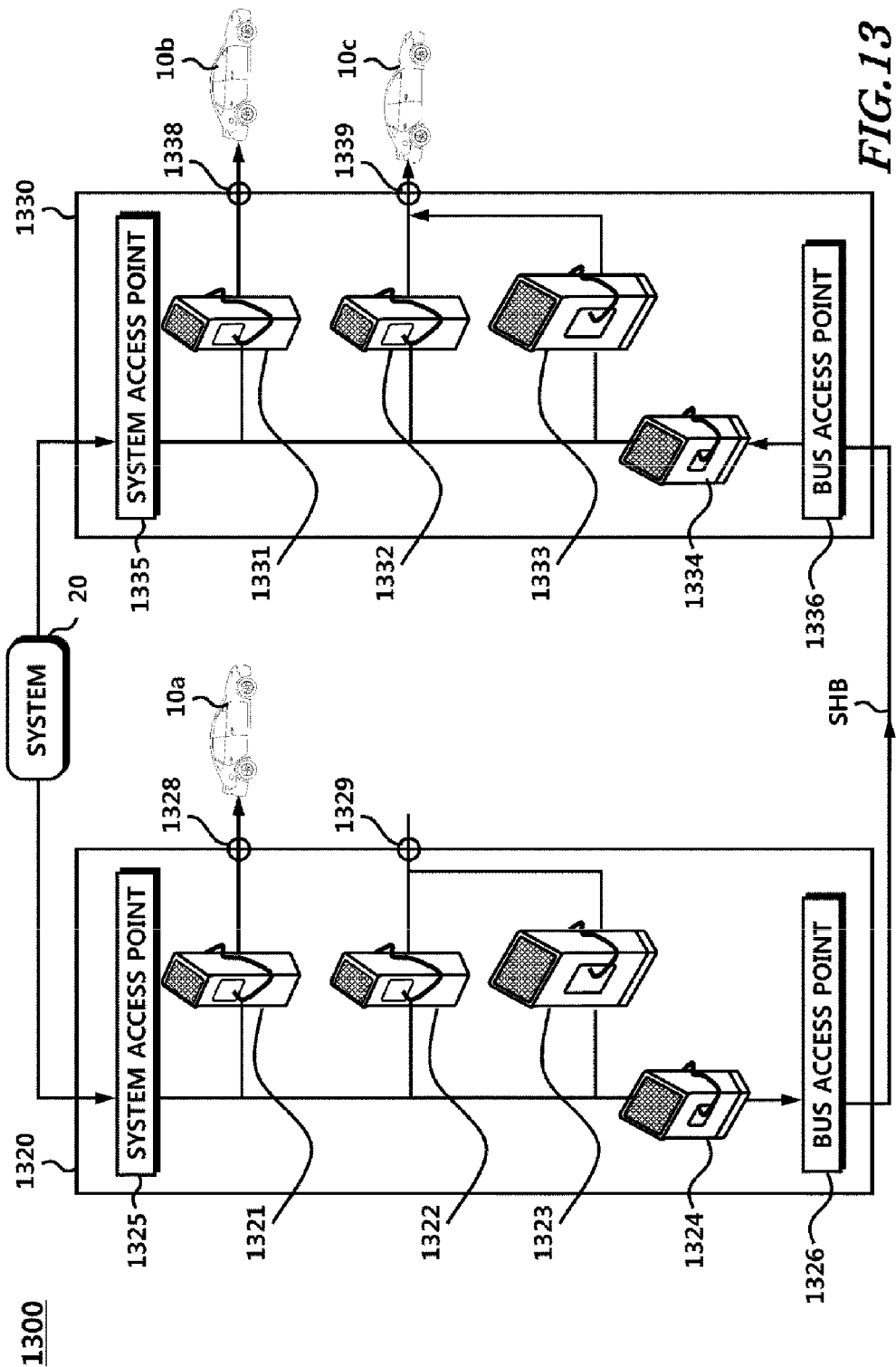
FIG. 13 illustrates the configuration of a charging system according to another embodiment of the present invention.

FIG. 13 illustrates the configuration of a charging system according to another embodiment of the present invention.

Referring to FIG. 13, the charging system 1300 includes two charging devices 1320, 1330. The charging system 1300 can include more than two charging devices, but it will be assumed in the following, for convenience of description, that the charging system 1300 includes two charging devices 1320, 1330.

Each of the first charging device 1320 and the second charging device 1330 is connected to a system 20 and is supplied with power, which is necessary for charging, from the system 20. The charging devices can also be supplied with power, which is necessary for charging, from a different power supply source from the system 20. For example, the charging system 1300 may be included in a microgrid, which may include a distributed power source, such as a fuel cell generator or a wind power generator, therein. In this case, the charging system 1300 can be supplied with power, which is necessary for charging, from the fuel cell generator or the wind power generator of the microgrid. It will be assumed in the following, for convenience of description, that the charging devices are supplied with power from the system 20.

Meanwhile, the first charging device 1320 and the second charging device 1330 are connected to each other via a shared bus SHB. The shared bus SHB either provides a path, through which available power of the first charging device 1320 is transmitted to the second charging device 1330, or provides a path, through which available power of the second charging device 1330 is transmitted to the first charging device 1320. The shared bus SHB guarantees that, when one of the charging devices 1320, 1330 lacks power due to the limit of power capacity of each of them, the other charging device supplies the lacking power.

More specifically, a technology for transferring available power of the first charging device 1320 to the second charging device 1330 via components included in each of the charging devices 1320, 1330 will now be described.

Referring to FIG. 13 again, the first charging device 1320 may include a first system access point 1325, a first slow charger 1321, a second slow charger 1322, a first rapid charger 1323, a first power transmitter 1324, and a first bus access point 1326. In addition, the second charging device 1320 may include, as components corresponding to those of the first charging device, a second system access point 1335, a third slow charger 1331, a fourth slow charger 1332, a second fast charger 1333, a second power transmitter 1334, and a second bus access point 1336.

The first system access point 1325 and the second system access point 1335 are connected to the system 20 and are supplied with power from the system 20.

The first system access point 1325 and the second system access point 1335 may substantially be composed of power cables only. In this case, the hardware-related power capacity of the first system access point 1325 and the second system access point 1335 may be determined by the power transmission capacity of the power cables. The power transmission capacity of a power cable is generally determined by the unit resistance of the power cable, and the smaller the unit resistance is, the more the power transmission capacity increases.

The first system access point 1325 and the second system access point 1335 may include circuit breakers. A circuit breaker is a device configured to interrupt the power cable when the current corresponds to a predetermined value or higher, thereby protecting the system from an overcurrent. Such a circuit breaker has a predetermined power capacity, which may be the power capacity of the first system access point 1325 and the second system access point 1335.

The first system access point 1325 and the second system access point 1335 may include meters. In order to count the amount of power flowing into each charging device 1320, 1330, the system access points 1325, 1335, which correspond to inlets of respective charging devices 1320, 1330, may include meters. Data of the meters can be used as factors that determine the power unit price of the charging devices. The power unit price is calculated progressively, meaning that the power unit price increases in proportion to the amount of power used. As a result, the power fee could rise exponentially as the amount of power used increases.

Such a progressive power pricing system may be an element that limits the power capacity of the charging devices 1320, 1330. The charging devices 1320, 1330 supply automobiles with charging power and receive charging fees in return, and, if the power prices are higher than the charging fees, the charging devices 1320, 1330 will make a loss. Accordingly, the charging devices 1320, 1330 may supply charging power up to a predetermined power unit price limit and stop supplying charging power if the limit is exceeded. The fact that charging power is not supplied above a predetermined power unit price means that the charging devices 1320, 1330 do not supply more than a predetermined power capacity. In other words, the power pricing policy gives the charging devices 1320, 1330 a predetermined power capacity.

Besides, the first system access point 1325 and the second system access point 1335 may include diodes that prevent reverse currents. The diodes prevent currents, which have been generated by the charging devices 1320, 1330, from flowing into the system 20. Diodes have a predetermined limit regarding currents or voltages, and such a current limit value or voltage limit value of diodes may determine the power capacity of the first system access point 1325 and the second system access point 1335.

Furthermore, the first system access point 1325 and the second system access point 1335 may further include transformers. Transformers are devices configured to increase or decrease AC voltages. Such transformers also have a predetermined power capacity, which may determine the power capacity of the first system access point 1325 and the second system access point 1335.

The first system access point 1325 and the second system access point 1335 may include various components as described above, and the power capacity of the first system access point 1325 and the second system access point 1335 is determined by the lowest limit value of such components. For example, when the power capacity of the transformers is very low while other components have sufficiently large margins, the power capacity of the first system access point 1325 and the second system access point 1335 is determined by the power capacity of the transformers.

When the first system access point 1325 and the second system access point 1335 have a power capacity as described above, chargers included in respective charging devices 1320, 1330 have a total charging capacity larger than such a power capacity.

To be specific, the first charging device 1320 includes a first slow charger 1321, a second slow charger 1322, and a first rapid charger 1323, and the total charging capacity, which is the sum of charging capacities of the chargers 1321, 1322, 1323, has a value larger than the power capacity of the first charging device 1320. Assuming, for example, that the first charging device 1320 has a power capacity of 5 KW, the first slow charger 1321 has 2 KW, the second slow charger 1322 has 2 KW, and the first rapid charger 1323 has 4 KW: the total charging capacity is then 8 KW, which may be larger than the power capacity (e.g. 5 KW) of the first charging device 1320. Referring to FIG. 13, however, the first charging device 1320 has only two charging connectors, so that the total charging capacity may be smaller than the simple sum of charging capacities of respective chargers. In FIG. 13, the first charging connector 1328 is connected to the first slow charger 1321, while the second charging connector 1329 is connected both to the second slow charger 1322 and the first rapid charger 1323. In fact, the second charging connector 1329 includes a switch and connects only one of the second slow charger 1322 and the first rapid charger 1323 with an automobile. Consequently, the total charging capacity of the first charging device 1320 is 6 KW, which is the sum of 2 KW of the first slow charger 1321 and 4 KW of the first rapid charger 1323 (charging capacity when a charger of a larger capacity is connected to the second charging connector 1329). The total charging capacity of the first charging device has a value larger than the power capacity even if the total charging capacity is calculated using the latter method.

The second charging device 1330 also has a total charging capacity larger than the power capacity. The second charging device 1330 may have substantially the same configuration as the first charging device 1320. In this case, the second charging device 1330 is also structured so that the third slow charger 1331 is connected to the third charging connector 1338, and the fourth slow charger 1332 and the second rapid charger 1333 are together connected to the fourth charging connector 1339, so that the total charging capacity may be 6 KW as in the above-described example. When the second charging device 1330 has a power capacity of 5 KW, the second charging device 1330 also has a total charging capacity larger than the power capacity.

The fact that the total charging capacity of the charging devices is larger than the power capacity of the system access points is for the purpose of enabling the charging devices to efficiently provide various types of services.

For example, the first charging device 1320 normally uses the first slow charger 1321 and the second slow charger 1322 to supply two automobiles with charging power (first service case). In this case, the amount of charging power supplied totals 4 KW, 2 KW for each, and charging power can be supplied stably within the range of power capacity (5 KW) of the first charging device 1320. As another service case, the first charging device 1320 uses the rapid charger 1323 to supply one automobile with charging power (second service case). In this case, the amount of charging power supplied is 4 KW of the rapid charger, and the first charging device 1320 can rapidly charge one automobile within the range of power capacity (5 KW).

The above-mentioned service cases correspond to normal cases in which respective charging devices supply automobiles, which are connected to respective charging devices, with charging currents. However, the second charging device 1330 cannot supply the entire charging power on its own in the following service case (third service case).

Referring to FIG. 13, in the third service case, the first charging device 1320 has a first automobile 10a connected to the first slow charger 1321, and the second charging device 1330 has a second automobile 10b connected to the third slow charger 1331 and a third automobile 10c connected to the second rapid charger 1333. In such a third service case, the charging power that the second charging device 1330 needs to supply is 6 KW, which is the sum of 2 KW for the second automobile 10b and 4 KW for the third automobile 10c, and this charging capacity exceeds the power capacity of the second charging device 1330, i.e. 5 KW.

In the third service case, the first charging device 1320 has available power of 3 KW, 1 KW of which is transmitted to the second charging device 1330 via the shared bus SHB so that the second charging device 1330 can supply both the second automobile 10b and the third automobile 10c with charging power.

Respective components will be described in the following with connection with the third service case illustrated in FIG. 13. In addition, embodiments of the first slow charger 1321, the fourth slow charger 1332, and the second rapid charger 1333 will mainly be described in the following embodiment; embodiments of the fourth slow charger 1332 can be applied to the second slow charger 1322; embodiments of the first slow charger 1321 can be applied to the third slow charger 1331; and embodiments of the second rapid charger 1333 can be applied to the first rapid charger 1323.

First, embodiments of the first slow charger 1321, the third slow charger 1332, and the second rapid charger 1333 will be described.

Figure 14:
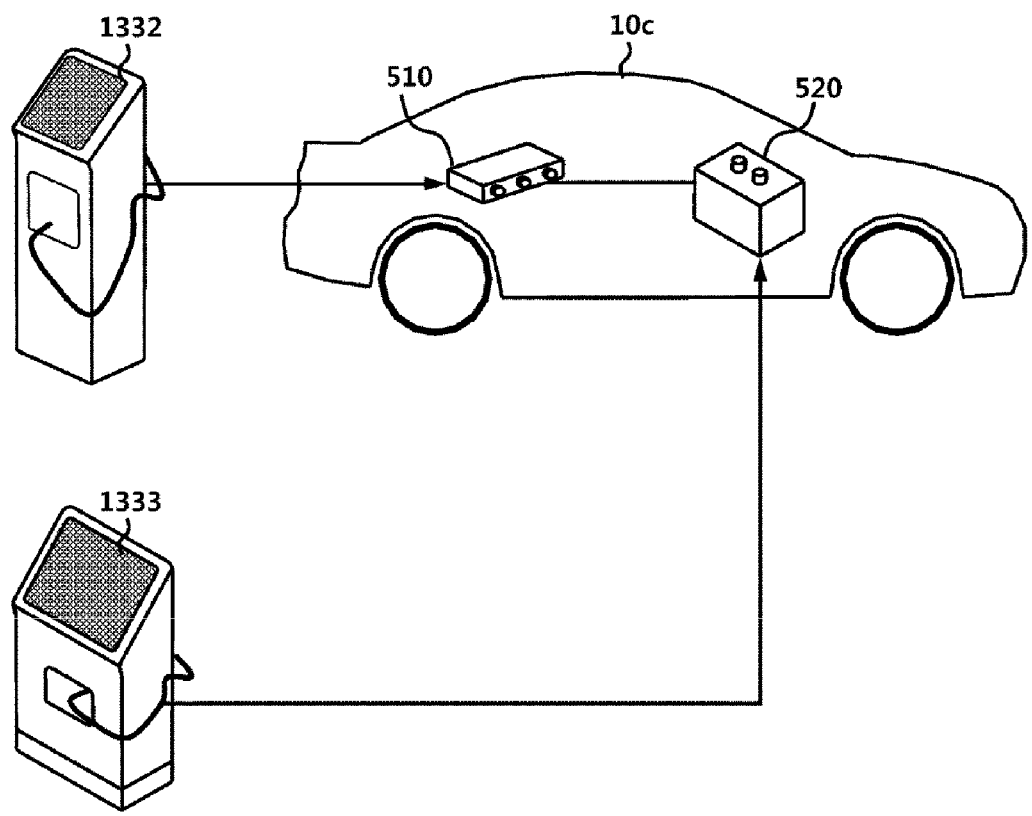
FIG. 14 illustrates paths through which a slow charger and a rapid charger connect to a battery of an automobile.

FIG. 14 illustrates paths through which a slow charger and a rapid charger connect to a battery of an automobile. FIG. 14 illustrates the fourth slow charger 1332 of the second charging device 1330 as a representative example of a slow charger and the second rapid charger 1333 of the second charging device 1330 as a representative example of a rapid charger, and the following embodiments can be applied to other slow chargers and rapid chargers.

Referring to FIG. 14, the fourth slow charger 1332 can be connected to an onboard charger 510 of the third automobile 10c. The onboard charger 510 is a kind of power converter installed inside the third automobile 10c to convert power, which is supplied from the outside, into a voltage and a current conforming to characteristics of the battery 520 inside the automobile. The fourth slow charger 1332 can supply the automobile 10c with AC voltage-type power, and the onboard charger 510, which is installed inside the automobile 10c, converts the AC voltage-type power into DC voltage-type power and supplies the battery 520 with the converted power. Since the onboard charger 510 is installed inside the third automobile 10c, the capacity of power it can convert is small (the size of power converters generally increases in proportion to the capacity of power they can convert). Therefore, the fourth slow charger 1332, which supplies a small capacity of charging power, is coupled to the onboard charger 510.

Referring to FIG. 14 again, the second rapid charger 1333 can be connected to the battery 520 of the third automobile 10c. Of course, the battery 520 as used herein refers not only to the basic structure of a chemical cell, but also includes the peripheral circuit unit that surrounds the basic structure of the chemical cell. For example, the battery 520 may include a protective circuit for safety, and may also include a BMS (battery management system) which measures inputted/outputted power and informs of the charging state of the battery 520.

The second rapid charger 1333 is directly connected to the battery 520 and therefore can transfer a large capacity of power to the battery 520 within a short period of time. However, since the battery 520 can only receive DC-type power, the second rapid charger 1333 needs to convert AC-type power into DC-type power and provides the third automobile 10*c* with the DC-type power.

Figure 15:
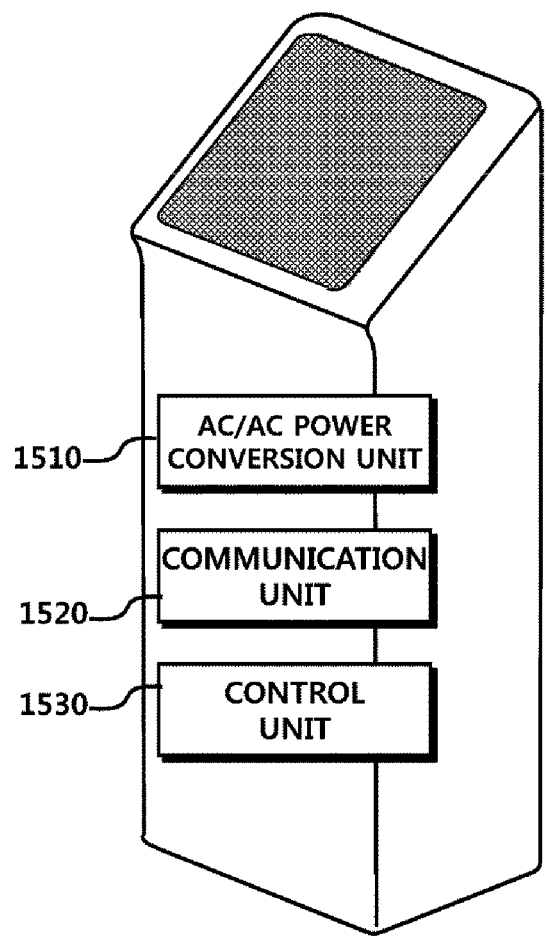
FIG. 15 illustrates the configuration of a first slow charger according to another embodiment of the present invention.

FIG. 15 illustrates the configuration of a first slow charger according to another embodiment of the present invention.

Referring to FIG. 15, the first slow charger 1321 may include an AC/AC power conversion unit 1510, a communication unit 1520, and a control unit 1530.

The AC/AC power conversion unit 1510 is configured to convert the voltage of power, which is supplied from the system 20, into AC voltage type that is suitable for the onboard charger of the first automobile 10*a*. The AC/AC power conversion unit 1510 can also perform current control for adjusting the amount of current flowing into the first automobile 10*a*. When the AC/AC power conversion unit 1510 performs current control, the AC/AC power conversion unit 1510 controls the amount of charging power using the current, because the voltage is fixed.

The communication unit 1520 is a device capable of exchanging information with other devices. The communication unit 1520 can transmit information regarding the amount of charging power, which is currently supplied by the first slow charger 1321, to other devices. Such information regarding the amount of charging power can be transmitted to other devices included in the same charging device, such as the second slow charger 1322, the first rapid charger 1323, and the first power transmitter 1324. In addition, such information regarding the amount of charging power can also be transmitted to a device outside the first charging device 1320, such as a device in the second charging device 1330. Besides, when a central controller (not illustrated) that manages the first charging device 1320 and the second charging device 1330 is included in the charging system 1300, the communication unit 1520 can also transmit information regarding the amount of charging power to the central controller (not illustrated).

The control unit 1530 is configured to perform overall control of the first slow charger 1321 for implementing an embodiment of the present invention.

Figure 16:
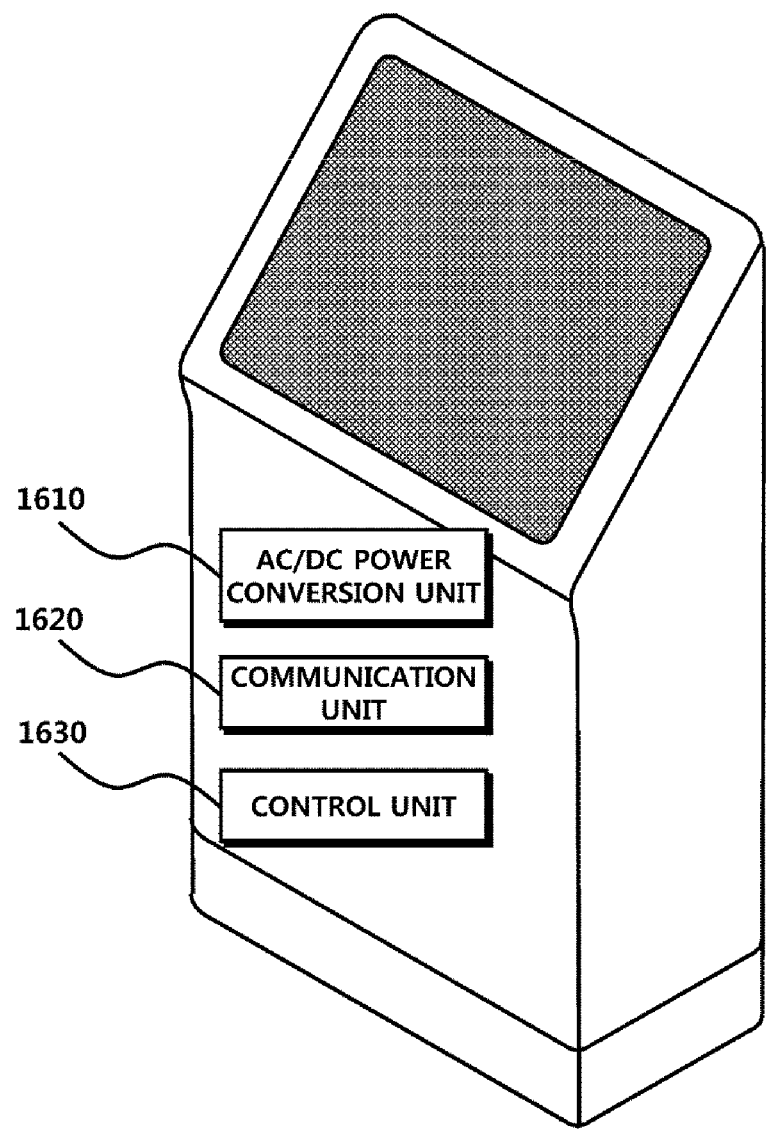
FIG. 16 illustrates the configuration of a second rapid charger according to another embodiment of the present invention.

FIG. 16 illustrates the configuration of a second rapid charger according to another embodiment of the present invention.

Referring to FIG. 16, the second rapid charger 1333 may include an AC/DC power conversion unit 1610, a communication unit 1620, and a control unit 1630.

The AC/DC power conversion unit 1610 is configured to convert the voltage of power, which is supplied from the system 20, into DC voltage type that is suitable for the battery 520 of the third automobile 10*c*. The AC/DC power conversion unit 1610 can also perform current control for adjusting the amount of current flowing into the third automobile 10*c*. When the AC/DC power conversion unit 1610 performs current control, the AC/DC power conversion unit 1610 controls the amount of charging power using the current, because the voltage is fixed.

The communication unit 1620 is a device capable of exchanging information with other devices. The communication unit 1620 can transmit a message that requests information regarding the amount of charging power, which is currently supplied by the third slow charger 1331, to the third slow charger 1331 and receive a corresponding response. In addition, the communication unit 1620 can transmit a message that requests information regarding the amount of charging power, which is currently supplied by the third slow charger 1331, to the above-mentioned central controller (not illustrated) and receive a corresponding response.

The control unit 1630 is configured to perform overall control of the second rapid charger 1333 for implementing an embodiment of the present invention. Using the information regarding the amount of charging power currently supplied by the third slow charger 1331, which has been acquired via the communication unit 1620, the control unit 1630 can determine whether charging power, which is supplied by the second rapid charger 1333, exceeds the power capacity of the second charging device 1330 or not. For example, when a second automobile 10*b* is connected to the third slow charger 1331 and is supplied with charging power of 2 KW from the third slow charger 1331, and when the second rapid charger 1333 begins to supply a third automobile 10*c* with rapid charging power of 4 KW, the second charging device 1330 exceeds the power capacity with regard to the system 20. The control unit 1630 can determine whether the second charging device 1330 can exceed the power capacity with regard to the system 20 or not by acquiring information regarding the amount of charging power from a different charger (e.g. the third slow charger 1331).

When it is determined that charging power supply by the second rapid charger 1333 exceeds the power capacity of the second charging device 1330 with regard to the system 20, the control unit 1630 can transmit a message that requests power transmission by a different charging device, e.g. the first charging device 1320. In this case, generation of the message can be performed by the control unit 1630, and transmission thereof can be performed by the communication unit 1620.

The messages requesting power transmission by a different charging device can not only be directly transmitted to a different charging device, e.g. the first charging device 1320, but also to the above-mentioned central controller (not illustrated).

In response to such a request, the first power transmitter 1324 of the first charging device 1320 transmits available power of the first charging device 1320 to the second charging device 1330 via the shared bus SHB.

Figure 17A:
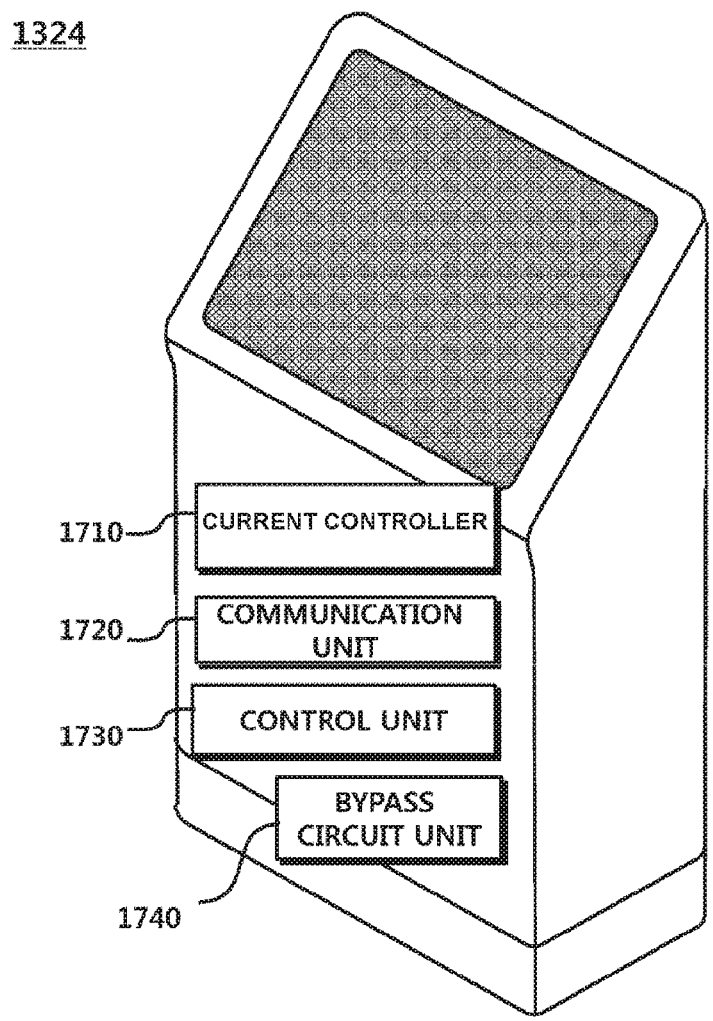
FIG. 17A and FIG. 17B illustrate the configuration of a first power transmitter according to another embodiment of the present invention.
Figure 17B:
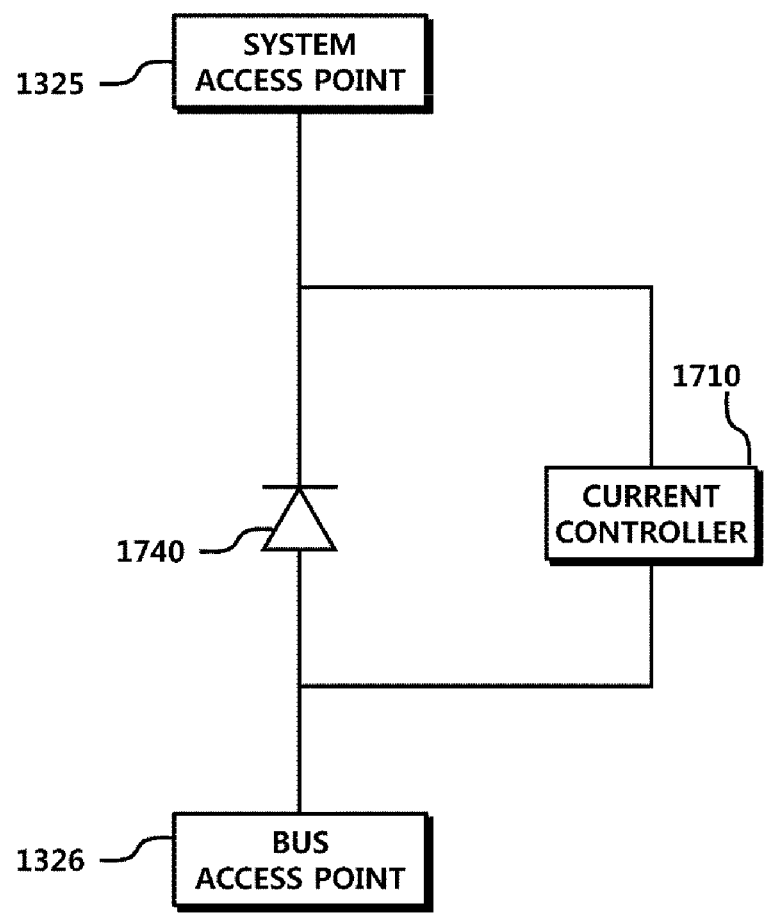

FIG. 17A and FIG. 17B illustrate the configuration of a first power transmitter according to another embodiment of the present invention.

Referring to FIG. 17A, the first power transmitter 1324 may include a current controller 1710, a communication unit 1720, a control unit 1730, and a bypass circuit 1740.

The current controller 1710 is configured to transmit power from the system 20 to the shared bus SHB. The current controller 1710 may be connected in parallel with a bypass circuit 1740, which supplies chargers of the first charging device 1320 with power of the shared bus SHB that is supplied from the second bus access point 1336.

FIG. 17B illustrates a connection relationship between the current controller 1710 and the bypass circuit 1740 of the first power transmitter 1324. Referring to FIG. 17B, the current controller 1710 can transfer power of the system 20, which is supplied via the first system access point 1325, to the bus access point 1326. The power transferred to the bus access point 1326 is transmitted to the second charging device 1330 via the shared bus SHB.

Referring to FIG. 17B, the first power transmitter 1324 may further include a bypass circuit 1740, which is a circuit for the first charging device 1320 to receiver power from a different charging device. The bypass circuit 1740 may include a diode only, and the diode prevents power of the system 20, which has been supplied to the first charging device 1320, from flowing out to the shared bus SHB not via the current controller 1710 (prevents a reverse current) and provides a path for receiving power transmitted from a different charging device, which has been transferred to the shared bus SHB.

The communication unit 1720 can communicate with the second charging device 1330 and provide information regarding the amount of power that can be supplied to the second charging device 1330. To this end, the communication unit 1720 can communicate with other devices within the first charging device 1320 and acquire information regarding the amount of available power of the first charging device 1320, and can generate information regarding the amount of power that can be supplied, which can be transmitted to a different charging device, on the basis of the information regarding the available power and transmit the generated information to a different charging device. The communication unit 1720 can also communicate with the above-mentioned central controller (not illustrated) and exchange related information.

The control unit 1730 can perform overall control of the first power transmitter 1324 for implementing an embodiment of the present invention, and the control unit 1730 can interwork with the second rapid charger 1333 of the second charging device and perform power transmission according to the lacking power of the second charging device 1330. For example, when the lacking power of the second charging device 1330 is 0.5 KW, the amount of power transmission of the first power transmitter 1324 is 0.5 KW, and the second rapid charger 1333 increases the amount of charging power by 1 KW, the first power transmitter 1324 can increase the amount of power transmission by 1 KW. When the first power transmitter 1324 and the second rapid charger 1333 interwork in this manner, the amount of power transmission of the first charging device and the lacking power of the second charging device 1330 are balanced with each other so that the system maintains a stable overall state.

Meanwhile, the control unit 1730 transmits power equal to the amount of lacking power of a different charging device, and, when the different charging device has substantially the same configuration as the first charging device 1320, the maximum amount of lacking power of the different charging device is a difference between the power capacity of the first system access point and the total charging capacity of the chargers (first slow charger 1321, second slow charger 1322, and first rapid charger 1323). Accordingly, the control unit 1730 can supply a different charging device with an amount of power within such a difference.

When the first power transmitter 1324 transmits the amount of lacking power to the second charging device 1330, the portion of the amount of charging power supplied by the chargers (third slow charger 1331, fourth slow charger 1332, and second rapid charger 1333) of the second charging device 1330, which exceeds the power capacity of the second system access point 1335, is supplied from the second bus access point 1336.

The first bus access point 1326 and the second bus access point 1336, which provide paths for receiving power transmitted via the shared bus SHB or for transmitting power of the charging device to the shared bus SHB, may be composed of power cables only.

In addition, the first bus access point 1326 and the second bus access point 1336 may further include circuit breakers or meters to protect the system from an overcurrent or measure the amount of power flowing in/out between each charging device and the shared bus SHB.

Figure 18:
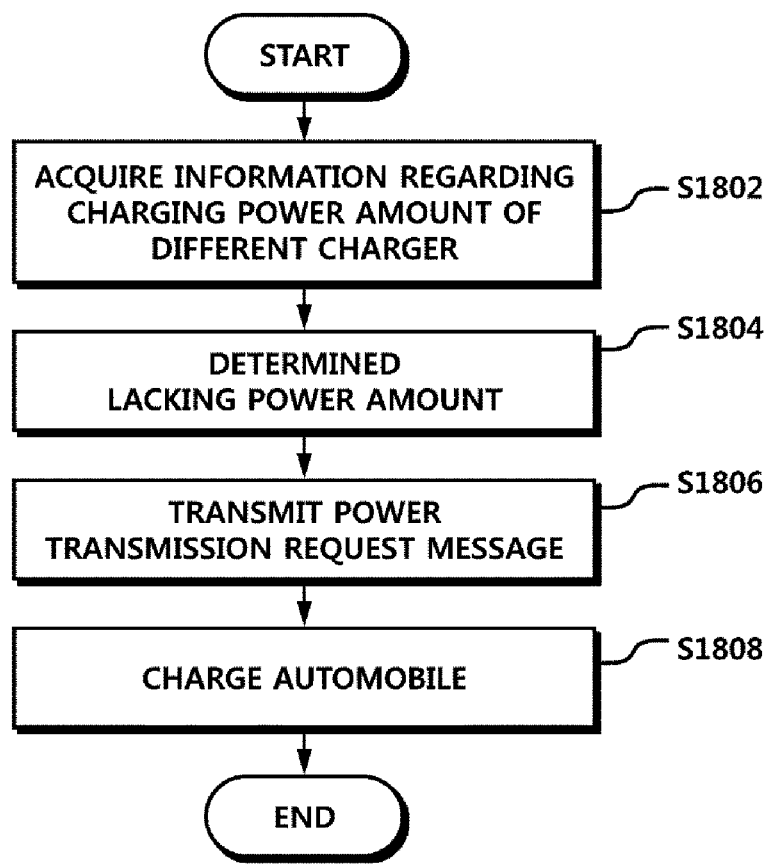
FIG. 18 is a flowchart of an example of control of a second rapid charger in a charging device according to another embodiment of the present invention.

FIG. 18 is a flowchart of an example of control of a second rapid charger in a charging device according to another embodiment of the present invention.

Referring to FIG. 18, the second rapid charger 1333 acquires information regarding the amount of charging power supplied by a different charger in the second charging device (S1802).

The second rapid charger 1333 then calculates the total amount of charging power of the second charging device 1330 by adding the amount of charging power, which is to be supplied to the third automobile 10c, and the acquired amount of charging power supplied by the different charger. In addition, the second rapid charger 1333 compares the calculated amount of total charging power of the second charging device 1330 with the power capacity of the second charging device 1330 (S1804).

When it is confirmed by the comparison (S1804) that the total amount of charging power exceeds the power capacity of the second charging device 1330, the second rapid charger 1333 transmits a power transmission request message to a different charging device, e.g. the first charging device 1320 (S1806). In the step (S1806) of transmitting a power transmission request message, the second rapid charger 1333 can acquire information regarding the amount of available power from a different charging device and transmit a power transmission request message to the different charging device within the range of the amount of available power.

When power transmission from the different charging device is initiated, the second rapid charger 1333 can supply the third automobile 10c with charging power using the supplied power.

Figure 19:
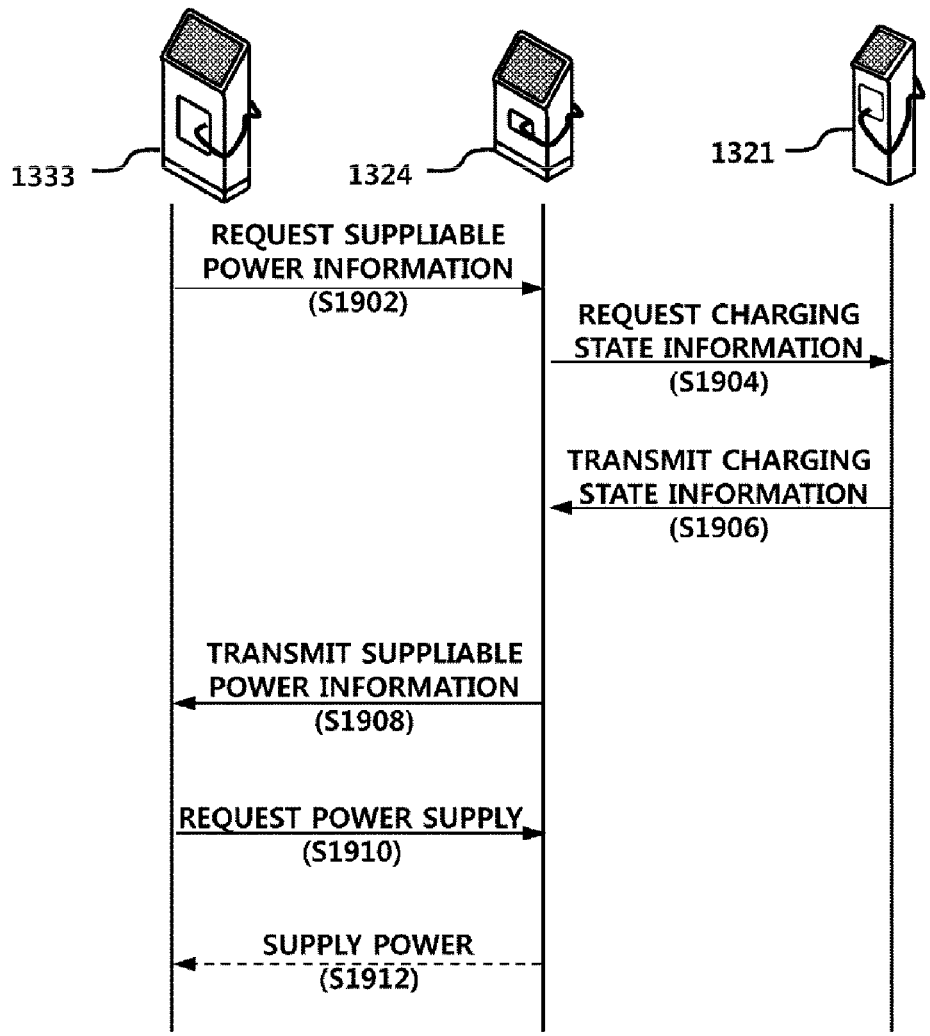
FIG. 19 illustrates a flow of control messages as a flow of messages between devices.

FIG. 19 illustrates a flow of messages between devices according to the control method illustrated in FIG. 18.

FIG. 19 illustrates control messages after the second rapid charger 1333 has acquired information regarding the amount of charging power, which is supplied from a different charger in the second charging device, and determined on the basis of the information that power lacking has occurred.

Referring to FIG. 19, the second rapid charger 1333 transmits a message, which requests information regarding power that can be supplied, to the first power transmitter 1324 of the first charging device 1320 (S1902).

After receiving the message requesting information regarding power that can be supplied, the first power transmitter 1324 transmits a message requesting charging state information to the first slow charger 1321, in order to grasp the charging power supplying state of the first charging device 1320 (S1904). Although not illustrated in FIG. 19, the first power transmitter 1324 can transmit similar messages requesting charging state information to other chargers (second slow charger 1322 and first rapid charger 1323).

The first power transmitter 1324 then receives charging state information from the first slow charger 1321 and receives charging state information from other chargers (second slow charger 1322 and first rapid charger 1323) as well (S1906).

On the basis of the charging state information, the first power transmitter 1324 can calculate information regarding power that can be supplied by the first charging device 1320 and transmit the calculated information to the second rapid charger 1333 (S1908).

The second rapid charger 1333 can transmit a power transmission request message to the first power transmitter 1324 to request power supply within the range of the amount of power that can be supplied by the first charging device 1320, which is included in the information regarding power that can be supplied (S1910).

When the first power transmitter 1324 supplies power in response to the power transmission request message, the second rapid charger 1333 can supply the third automobile 10c with charging power using the supplied power (S1912).

Figure 20:
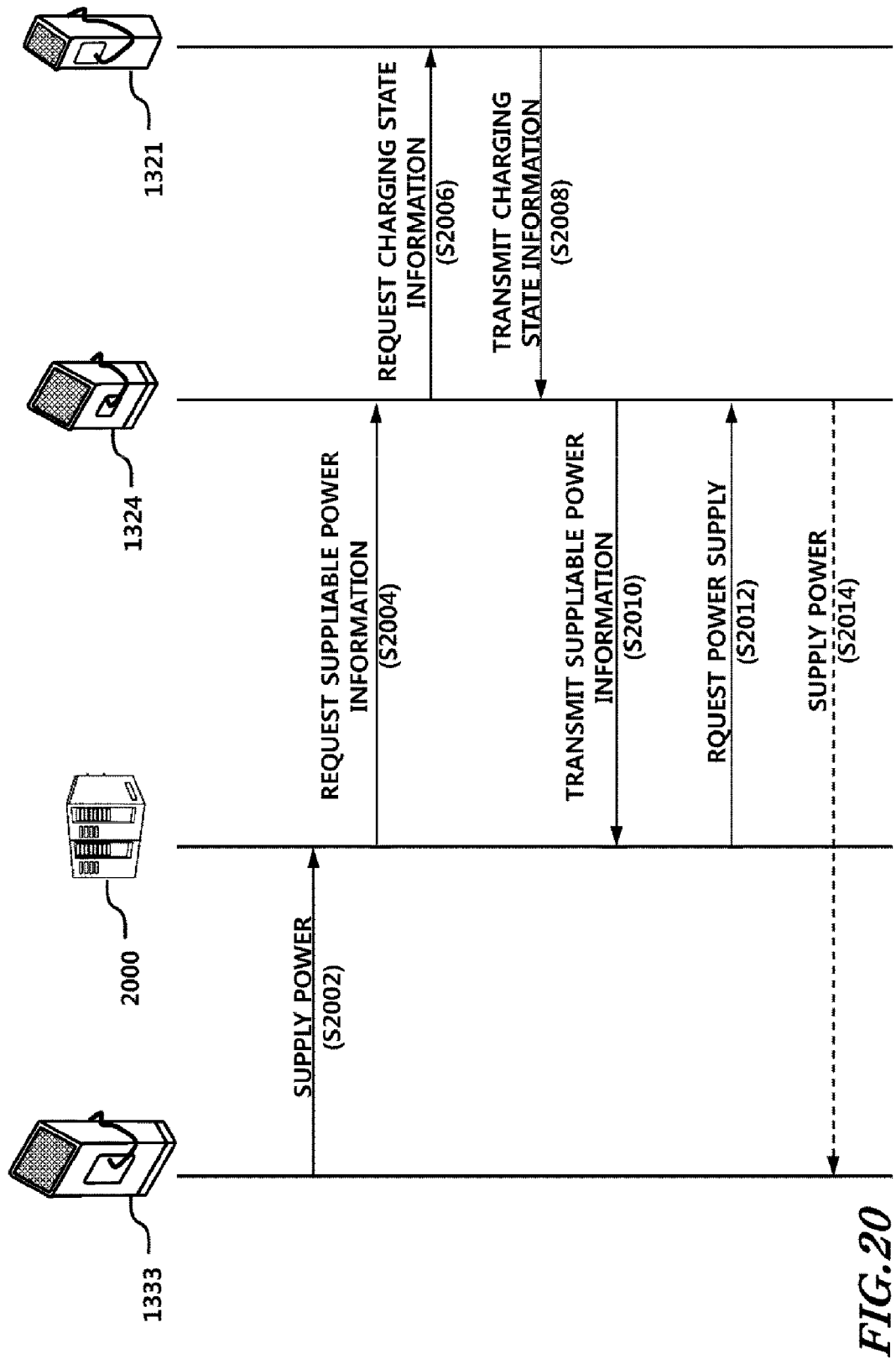
FIG. 20 illustrates a flow of messages in connection with a method for controlling charging devices by a central controller in a charging system according to another embodiment of the present invention.

FIG. 20 illustrates a flow of messages in connection with a method for controlling charging devices by a central controller in a charging system according to an embodiment of the present invention.

Unlike the embodiment of FIG. 18 and FIG. 19, the charging system 1300 further includes a central controller 2000, which is in charge of control messages, in the embodiment of FIG. 20.

Referring to FIG. 20, the central controller 2000 receives a power supply request message from the second rapid charger 1333 of the second charging device 1330, the message requesting power transmission by a different charging device as much as the amount of charging power that exceeds the power capacity (S2002).

In response to the power supply request message, the central controller 2000 requests the first power transmitter 1324 of the first charging device 1320 to provide information regarding power that can be transmitted to the second charging device 1330 (S2004).

After receiving the request for information regarding power that can be transmitted, the first power transmitter 1324 transmits a message requesting charging state information to the first slow charger 1321, in order to grasp the internal state of the first charger (S2006). Although not illustrated in FIG. 20, the first power transmitter 1324 can transmit similar messages requesting charging state information to other chargers (second slow charger 1322 and first rapid charger 1323).

The first power transmitter 1324 then receives charging state information from the first slow charger 1321 and receives charging state information from other chargers (second slow charger 1322 and first rapid charger 1323) as well (S2008).

On the basis of the charging state information, the first power transmitter 1324 can calculate information regarding power that can be supplied by the first charging device 1320 and transmit the calculated information to the central controller 2000 (S2010).

On the basis of such information, the central controller 2000 transmits a power transmission request message to the first power transmitter 1324 to request power transmission (S2012).

The second rapid charger 1333 then supplies the third automobile 10c with charging power using the power supplied by the first power transmitter 1324.

Meanwhile, in an embodiment of the present invention described with reference to FIG. 13 to FIG. 20, the first slow charger 1321 to the fourth slow charger 1332, the first rapid charger 1323 to the second rapid charger 1333, and the first power transmitter 1324 to the second power transmitter 1334 may be configured as modules.

When the first slow charger 1321 to the fourth slow charger 1332, the first rapid charger 1323 to the second rapid charger 1333, and the first power transmitter 1324 to the second power transmitter 1334 are configured as modules, respective devices can be connected to each other via data lines, and one communication unit and one control unit can exist for both the first charging device 1320 and the second charging device 1330, instead of respective communication units and control units.

Further, the terms "includes", "constitutes", or "has" mentioned above mean that a corresponding structural element is included unless they have no reverse meaning. Accordingly, it should be interpreted that the terms may not exclude but further include other structural elements.

All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although the embodiments of the present invention have been described for illustrative purposes, those skilled in the art will appreciate that various modifications, additions and substitutions are possible, without departing from the scope and spirit of the invention. Accordingly, the embodiments disclosed in the present invention are merely to not limit but describe the technical spirit of the present invention. Further, the scope of the technical spirit of the present invention is limited by the embodiments. The scope of the present invention shall be construed on the basis of the accompanying claims in such a manner that all of the technical ideas included within the scope equivalent to the claims belong to the present invention.

What is claimed is:

1. A charging system comprising:
a first charging device including at least two first output units each configured to supply automobiles connected thereto with charging power, a first bus electrically connected to the first output units and configured to transfer charging power to the first output units, and a first power processing unit configured to process power from a power source and supply the first bus with the processed power, the first power processing unit has a first capacity;
a second charging device including at least two second output units each configured to supply automobiles connected thereto with charging power, a second bus electrically connected to the second output units and configured to transfer charging power to the second output units, and a second power processing unit configured to process power, which is supplied from the power source and supply the second bus with the processed power, the second power processing unit has a second capacity; and
a shared bus connecting the first bus of the first charging device and the second bus of the second charging device;
wherein when power required to charge automobiles connected to the first output units exceeds the first capacity of the first power processing unit, and power required to charge automobiles connected to the second output unit is less than the second capacity of the second power processing unit, excess power processed by the second power processing unit that is not needed to charge automobiles connected to the second output units is routed to the first output units by way of the shared bus to charge automobiles connected to the first output units.

2. The charging system as claimed in claim 1, wherein the first bus comprises a first AC bus configured to supply AC power and a first DC bus configured to supply DC power.

3. The charging system as claimed in claim 2, wherein the shared bus comprises a shared AC bus configured to supply AC power and a shared DC bus configured to supply DC power, the shared AC bus is connected to a first AC bus of the first charging device and a second AC bus of the second charging device, and the shared DC bus is connected to a first DC bus of the first charging device and a second DC bus of the second charging device.

4. The charging system as claimed in claim 2, wherein the first power processing unit comprises a bidirectional AC/DC converter configured to convert power of the first AC bus into power of the first DC bus and convert power of the first DC bus into power of the first AC bus.

5. The charging system as claimed in claim 2, wherein the first power processing unit comprises a DC supply unit configured to convert three-phase AC power, which is supplied from a system, into DC power and supply the first DC bus with the DC power and an AC supply unit configured to supply the first AC bus with power of two phases of the three phases.

6. The charging system as claimed in claim 2, wherein the first charging device comprises a bus connection unit configured to connect the first bus and the shared bus, and
the bus connection unit comprises a DC/DC converter configured to convert power of the first DC bus into MVDC (Medium Voltage DC) power or HVDC (High Voltage DC) power or an AC/DC converter configured to convert power of the first AC bus into MVDC (Medium Voltage DC) power or HVDC (High Voltage DC) power.

7. The charging system as claimed in claim 6, wherein:
the shared bus is a first shared bus;
the charging system further comprises a second shared bus configured to connect a first bus of the first charging device and a third bus of a third charging device,
the first charging device comprises at least two bus connection units, and
the first charging device is configured to connect the first bus and the shared bus via a first bus connection unit and connect the first bus and the third bus via a second bus connection unit.

8. The charging system as claimed in claim 1, wherein each of the first output units comprises an output connector comprising both an AC output terminal connected to an onboard charger of a connected automobile and a DC output terminal connected to a battery of the connected automobile.

9. The charging system as claimed in claim 8, wherein the first bus comprises a first AC bus configured to supply AC power and a first DC bus configured to supply DC power, the first AC bus is configured to supply the AC output terminal of the first output units with AC power, and the first DC bus is configured to supply the DC output terminal of the first output units with DC power.

10. The charging system as claimed in claim 8, wherein each of the first output units comprises an output controller, the output controller is configured to supply the AC output terminal with charging power in a first charging power range and supply the DC output terminal with charging power in a second charging power range, and a maximum value of the second charging power range is larger than a maximum value of the first charging power range.

11. The charging system as claimed in claim 10, wherein the output controller comprises a charging mode selection unit, and
the charging mode selection unit is configured to selectively connect the AC output terminal and the DC output terminal according to a range of charging power supplied to a connected automobile.

12. The charging system as claimed in claim 10, wherein the output controller comprises a current controller, and the current controller is configured to adjust a charging rate of a connected automobile by controlling the amount of charging current.

13. The charging system as claimed in claim 1, wherein the first charging device comprises a bus connection unit configured to connect the first bus and the shared bus,
the bus connection unit comprises a power transmitter, and
the power transmitter is configured to transmit a part or all of remaining capacity, which is obtained by subtracting the total capacity of charging power supplied to connected automobiles from the first capacity, to the shared bus.

14. The charging system as claimed in claim 13, wherein the bus connection unit further comprises a bypass circuit configured to unidirectionally transfer power from the shared bus to the first bus, and the bypass circuit is connected in parallel with the power transmitter.

15. The charging system as claimed in claim 14, wherein the bypass circuit comprises a diode configured to prevent a reverse current.

16. The charging system as claimed in claim 1, wherein the power source is a system, and the charging devices are connected to the system using limited power capacities.

17. A method for controlling a first charging device comprising at least two output units configured to supply connected automobiles with charging power, the first charging device being supplied with power from a second charging device via a shared bus, the method comprising:
comparing an available charging capacity of the first charging device with a total amount of power required to rapidly charge automobiles connected to the first charging device;
when the available charging capacity of the first charging device is smaller than the total amount of power required to rapidly charge automobiles connected to the first charging device, determining whether the second charging device has sufficient excess charging capacity that when combined with the available charging capacity of the first charging device will at least equal the total amount of power required to rapidly charge automobiles connected to the first charging device;
displaying rapid charging on by at least one output unit when a first condition is present in which the available charging capacity of the first charging device is equal to or larger than the amount of rapid charging, and when a second condition is present in which the second charging device has sufficient excess charging capacity that when combined with the available charging capacity of the first charging device will at least equal the total amount of power required to rapidly charge automobiles connected to the first charging device; and
displaying a limited charging condition by the at least one output unit when the first condition and the second condition are not satisfied.

* * * * *